(12) United States Patent
Wilce et al.

(10) Patent No.: US 7,720,729 B2
(45) Date of Patent: May 18, 2010

(54) SYSTEMS AND METHODS FOR FACILITATING AGREEMENT GENERATION AND NEGOTIATION VIA AN AGREEMENT MODELING SYSTEM

(75) Inventors: Scot D. Wilce, Morristown, NJ (US);
Vincent A. George, Edgewater, NJ (US);
Hien Q. Nguyen, Jersey City, NJ (US);
Donna L. Conti, Cream Ridge, NJ (US);
Patrick E. Harris, New York, NY (US);
Donna M. Mansfield, Port Washington, NY (US)

(73) Assignee: Golman Sachs & Co., New York, NY (US)

( * ) Notice: Subject to any disclaimer, the term of this patent is extended or adjusted under 35 U.S.C. 154(b) by 2952 days.

(21) Appl. No.: 09/929,184

(22) Filed: Aug. 14, 2001

(65) Prior Publication Data
US 2003/0023527 A1    Jan. 30, 2003

Related U.S. Application Data

(63) Continuation-in-part of application No. 09/916,881, filed on Jul. 27, 2001.

(51) Int. Cl.
*G06Q 40/00* (2006.01)
(52) U.S. Cl. ...................................................... 705/35
(58) Field of Classification Search .................... 705/35
See application file for complete search history.

(56) References Cited

U.S. PATENT DOCUMENTS

| | | | |
|---|---|---|---|
| 5,692,206 A | 11/1997 | Shirley et al. | |
| 6,067,531 A | 5/2000 | Hoyt et al. | |
| 6,236,984 B1 | 5/2001 | Owens et al. | |
| 6,421,653 B1 | 7/2002 | May | |
| 6,778,968 B1 | 8/2004 | Gulati | |
| 2002/0010686 A1 | 1/2002 | Whitesage | |
| 2002/0023034 A1 | 2/2002 | Brown et al. | |
| 2002/0038278 A1 | 3/2002 | Himmelstein | |
| 2002/0042782 A1 | 4/2002 | Albazz et al. | |
| 2002/0087534 A1* | 7/2002 | Blackman et al. | ............... 707/4 |

(Continued)

FOREIGN PATENT DOCUMENTS

WO    WO 96/21903 A1    7/1996

(Continued)

OTHER PUBLICATIONS

Srinivasan, Sriram. Advanced Perl Programming. 1997 from Google books. (3 pages).*

(Continued)

*Primary Examiner*—Jennifer Liversedge
(74) *Attorney, Agent, or Firm*—Chadbourne & Parke LLP; Walter G. Hanchuk

(57) ABSTRACT

Systems and methods are provided to facilitate generation and/or negotiation of an agreement document via an agreement modeling system. According to one embodiment, agreement information associated with an agreement between a party and a counter-party is determined. An agreement document is generated in accordance with the agreement information, and it is automatically arranged for the agreement document to be received by the party and/or the counter-party. For example, an agreement modeling system controller may transmit the agreement document to the counter-party via an electronic mail address.

19 Claims, 26 Drawing Sheets

U.S. PATENT DOCUMENTS

| | | |
|---|---|---|
| 2002/0095311 A1 | 7/2002 | Donahue |
| 2002/0111922 A1 | 8/2002 | Young et al. |
| 2002/0188539 A1* | 12/2002 | Axelrad et al. ................ 705/35 |
| 2002/0198817 A1 | 12/2002 | Dhir |
| 2002/0198833 A1* | 12/2002 | Wohlstadter ................ 705/40 |
| 2004/0010463 A1 | 1/2004 | Hahn-Carlson et al. |

FOREIGN PATENT DOCUMENTS

| | | |
|---|---|---|
| WO | WO 01/75745 A1 | 10/2001 |
| WO | WO 02/10935 A1 | 2/2002 |

OTHER PUBLICATIONS

Computer Dictionary, $2^{nd}$ edition. Microsoft Press, 1994. p. 371.*

"PCT Notification of Transmittal of the International Search Report or the Declaration", dated Mar. 8, 2004 for PCT/US02/23896, 4pgs.

* cited by examiner

1100

| AGREEMENT IDENTIFIER 1102 | AGREEMENT TYPE 1104 | COUNTER-PARTY COMMUNICATION ADDRESS 1106 |
|---|---|---|
| A101 | MASTER AGREEMENT (ISDA_1.0) | CONTRACTS@CBAG.COM |
| A101-01 | AMENDMENT | FACSIMILE: (212) 555-1234 |
| A101-02 | AMENDMENT | FACSIMILE: (212) 555-1234 |
| A102 | MASTER AGREEMENT (OTC_2.2) | NONE (GENERATE HARD COPIES) |

FIG. 11

| | | | SWAPS | OPTIONS | | | | | |
|---|---|---|---|---|---|---|---|---|---|
| | | | | BUY | | | SELL | | |
| | | | | CALL | PUT | OTHER | CALL | PUT | OTHER |
| EQUITY | STOCK | | | | | | | | |
| | INDEX | | | | | | | | |
| FIXED INCOME | BONDS | | | | | | | | |
| | INDEX | | | | | | | | |
| | BANK NOTES | | | | | | | | |
| | WHOLE LOANS | | | | | | | | |
| COMMODITIES | METALS | PRECIOUS | GOLD | | | | | | |
| | | | SILVER | Y | | | | | |
| | | RARE | COPPER | | | | | | |
| | | | NICKEL | | | | Y | | |
| | ENERGY | NATURAL GAS | | | | | | | |
| | | CRUDE OIL | | | | | | | |
| | | REFINED PRODUCTS | | | | | | | |
| | | ELECTRICITY | | | | | | | |

FIG. 13

|  |  |  |  | SWAPS | OPTIONS | | | | | |
|---|---|---|---|---|---|---|---|---|---|---|
|  |  |  |  |  | BUY | | | SELL | | |
|  |  |  |  |  | CALL | PUT | OTHER | CALL | PUT | OTHER |
| EQUITY | STOCK |  |  |  |  |  |  |  |  |  |
|  | INDEX |  |  |  |  |  |  |  |  |  |
| FIXED INCOME | BONDS |  |  |  |  |  |  |  |  |  |
|  | INDEX |  |  |  |  |  |  |  |  |  |
|  | BANK NOTES |  |  |  |  |  |  |  |  |  |
|  | WHOLE LOANS |  |  |  |  |  |  |  |  |  |
| COMMODITIES | METALS | PRECIOUS | GOLD |  | Y | Y |  |  |  |  |
|  |  |  | SILVER |  | Y | Y |  |  |  |  |
|  |  | RARE | COPPER |  | Y | Y |  |  |  |  |
|  |  |  | NICKEL |  | Y | Y |  |  |  |  |
|  | ENERGY | NATURAL GAS |  |  | Y |  |  |  |  |  |
|  |  | CRUDE OIL |  |  | Y |  |  |  |  |  |
|  |  | REFINED PRODUCTS |  |  | Y |  |  |  |  |  |
|  |  | ELECTRICITY |  |  | Y |  |  |  |  |  |

```
AGREEMENT EDITOR                                          — □ X
FILE  VIEW
┌──┬──┬──┬──┬──┐  AGREEMENT DATA
└──┴──┴──┴──┴──┘
LCA TODAY

AGREEMENT DATA        AGREEMENT TYPE      [1997 IGDA MASTER ▽]
  COUNTER-PARTY DATA    AGREEMENT DATE      [9/26/2000        ▽]
  CREDIT SUPPORT        AGREEMENT STARTED    YES ● NO ○ UNKNOWN ○
  CROSS ACCELERATION    AGREEMENT TERMINATED YES ● NO ○ UNKNOWN ○
                        TERMINATION DATE    [11/28/2000       ▽]
                        AGREEMENT COUNTER-PARTY [CITIBANK     ▽]
                        ENTITY              [GSCO             ▽]
                        GROUP               [DERIVS           ▽]
                        TYPE                [CLOSE-OUT        ▽]

[GENERAL AGREEMENT HELP]  [COVERED PRODUCTS]  [AGREEMENT DOCUMENT]
```

FIG. 24

SYSTEMS AND METHODS FOR FACILITATING AGREEMENT GENERATION AND NEGOTIATION VIA AN AGREEMENT MODELING SYSTEM

CROSS-REFERENCE TO RELATED APPLICATIONS

The present invention is a continuation-in-part of U.S. patent application Ser. No. 09/916,881 entitled "Systems and Methods for Facilitating Agreement Definition via an Agreement Modeling System" filed on Jul. 27, 2001. The entire contents of that application are incorporated herein by reference.

FIELD

The present invention relates to agreements between parties. In particular, the present invention relates to systems and methods to facilitate generation and/or negotiation of an agreement document via an agreement modeling system.

BACKGROUND

Typically, an agreement between a party and a counter-party is manually defined by the parties. That is, one or both of the parties manually select a type of document that appropriately reflects the substance of the agreement (e.g., a particular type of contract) and/or agreement terms to be included in the document (e.g., contract clauses). The parties also manually generate and distribute the document for signature. Such a manual approach, however, has a number of disadvantages.

For example, the manual definition and generation of an agreement can be a time consuming and error-prone process, especially when a large number of potential document types and/or potential agreement terms can be associated with the agreement. Similarly, particular parties or localities may require different document types and/or agreement terms. As a result, the parties must carefully consider the substance of the agreement in order to select the appropriate document type and/or agreement terms.

Consider, for example, a transaction agreement associated with a number of different financial instruments (e.g., swaps and options) and financial products (e.g., equities and commodities). In this case, different combinations of financial instruments and financial products may call for different document types and/or agreement terms. Moreover, several different entities within a party (e.g., a bank's taxation department and legal department) may need to provide input to the process.

In addition, a single relationship between two parties may require that a number of different documents be generated, exchanged, and executed. For example, a master contract, a schedule to the master contract, a supporting document (e.g., a power of attorney), and a cover letter may all need to be generated. Manually generating and exchanging such sets of documents may be a difficult process, especially when different types of agreements require different combinations of documents.

It is known that some elements of agreement definition and generation may be automated. For example, U.S. Pat. No. 5,692,206 entitled "Method and Apparatus for Automating the Generation of a Legal Instrument" discloses a system that automates the generation of a legal document related to a negotiated agreement. Even this approach, however, does not address the potentially dynamic relationships that may exist between a party and a counter-party. For example, an agreement may be frequently amended to reflect new financial products or credit limits, and these amendments may be inter-related or retroactive. Such amendments are typically created as separate documents, making it difficult to ascertain the current status of an agreement, let alone the status of the agreement on a particular date in the past.

Moreover, known systems rely on hard-coded rules, programs, and architectures to facilitate definition of an agreement. Often, however, agreements are flexible (e.g., a new contract clause may suddenly become applicable to many different document types). In addition, the kinds of documents and contract terms that should be used for a particular agreement (or a way in which existing terms will be interpreted) can change over time. Because known systems are hard-coded, they may be unable to efficiently handle the fluid environments in which many agreements are made and changed. For example, a conventional database approach in which information is stored in pre-defined tables and columns may not be an effective, long-term approach to agreement definition and generation.

SUMMARY

To alleviate problems inherent in the prior art, the present invention introduces systems and methods to facilitate generation and/or negotiation of an agreement document via an agreement modeling system.

According to one embodiment, agreement information associated with an agreement between a party and a counter-party is determined. An agreement document is generated in accordance with the agreement information, and it is arranged for the agreement document to be received by the party and/or the counter-party.

Another embodiment is directed to a computer-implemented method of facilitating generation of an agreement document associated with a financial transaction agreement between a party and a counter-party. According to this embodiment, agreement information is received from a user associated with the party, the agreement information including (i) a counter-party communication address and (ii) information about a financial instrument and/or a financial product associated with the financial transaction agreement. The agreement document is generated in accordance with the agreement information and a covered products matrix. The agreement document is then automatically transmitted to the counter-party via the counter-party communication address.

According to another embodiment, contract information is determined. A first contract document and a second contract document are then generated in accordance with the contract information.

According to still another embodiment, at least one of the following are determined: (i) an agreement scope, (ii) a document scope, (iii) a fact set scope, and (iv) a work flow scope. The determined scope is placed in a scope stack, and the scope stack is evaluated via an evaluation engine to produce a result in accordance with at least one of (i) a rule, (ii) an action, and (iii) an expression. A contract document is then generated in accordance with the result.

According to yet another embodiment, a user defines agreement information associated with an agreement between a party and a counter-party. The user also defines a communication address to which an agreement document will be automatically transmitted.

One embodiment comprises: means for determining agreement information; means for generating an agreement document in accordance with the agreement information; and means for arranging for the agreement document to be received by a party and/or a counter-party.

Another embodiment comprises: means for receiving agreement information from a user associated with a party, the agreement information including (i) a counter-party communication address, and (ii) information about a financial instrument and/or a financial product associated with a financial transaction agreement; means for generating an agreement document in accordance with the agreement information and a covered products matrix; and means for automatically transmitting the agreement document to the counter-party via the counter-party communication address.

Another embodiment comprises means for determining contract information; means for generating a first contract document in accordance with the contract information; and means for generating a second contract document in accordance with the contract information.

Still another embodiment comprises, means for determining at least one of: (i) an agreement scope, (ii) a document scope, (iii) a fact set scope, and (iv) a work flow scope; means for placing the determined scope in a scope stack; means for evaluating the scope stack via an evaluation engine to produce a result in accordance with at least one of (i) a rule, (ii) an action, and (iii) an expression; and means for generating a contract document in accordance with the result.

Yet another embodiment comprises: means for defining agreement information associated with an agreement between a party and a counter-party; and means for defining a communication address to which an agreement document will be automatically transmitted.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 11 is a tabular representation of a portion of an agreement information database according to an embodiment of the present invention.

FIG. 13 illustrates an example of a covered products matrix according to an embodiment of the present invention.

FIG. 14 illustrates another example of a covered products matrix according to an embodiment of the present invention.

FIGS. 23 through 25 illustrate client displays associated with an agreement according to an embodiment of the present invention.

DETAILED DESCRIPTION

Embodiments of the present invention are associated with systems and methods to facilitate generation and/or negotiation of an agreement document associated with an "agreement" between a party and a counter-party. As used herein, the term "agreement" may refer to any arrangement between the parties. An agreement may be, for example, a legal contract defining a set of rights that exist between the parties, such as an INTERNATIONAL SWAP DEALERS ASSOCIATION® (ISDA®) master agreement associated with financial instruments and products. Note that a single agreement may be associated with more than two parties (e.g., three parties may enter into a legal contract). Also note that an agreement may or may not be legally binding (e.g., an agreement may simply reflect an informal understanding between parties).

In addition, as used herein the terms "party" and "counter-party" can refer to any entity associated with an agreement. A party may be, for example, a business, a business entity (e.g., a department within a business), or a person.

Agreement Modeling System Overview

Figure 1:
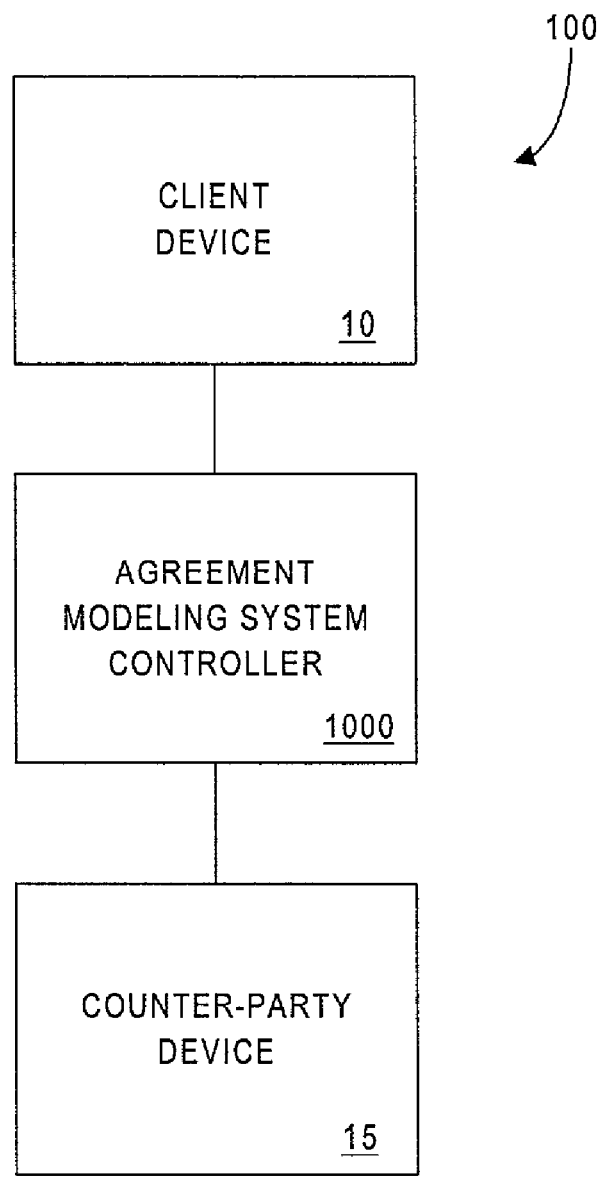
FIG. 1 is a block diagram overview of an agreement modeling system according to an embodiment of the present invention.

Turning now in detail to the drawings, FIG. 1 is a block diagram of an agreement modeling system 100 according to an embodiment of the present invention. As shown in FIG. 1, an agreement modeling system controller 1000 may interact with a client device 10 and a counter-party device 15. For example, a user may input information associated with a transaction agreement via the client device 10. The client device 10 may then transmit appropriate information to the agreement modeling system controller 1000, which in turn may store and/or interpret the information. The agreement modeling system controller 1000 may also generate one or more contract documents as appropriate and arrange for those documents to be transmitted to the counter-party device 15 (e.g., via an electronic mail message after approval by the user).

Figure 2:
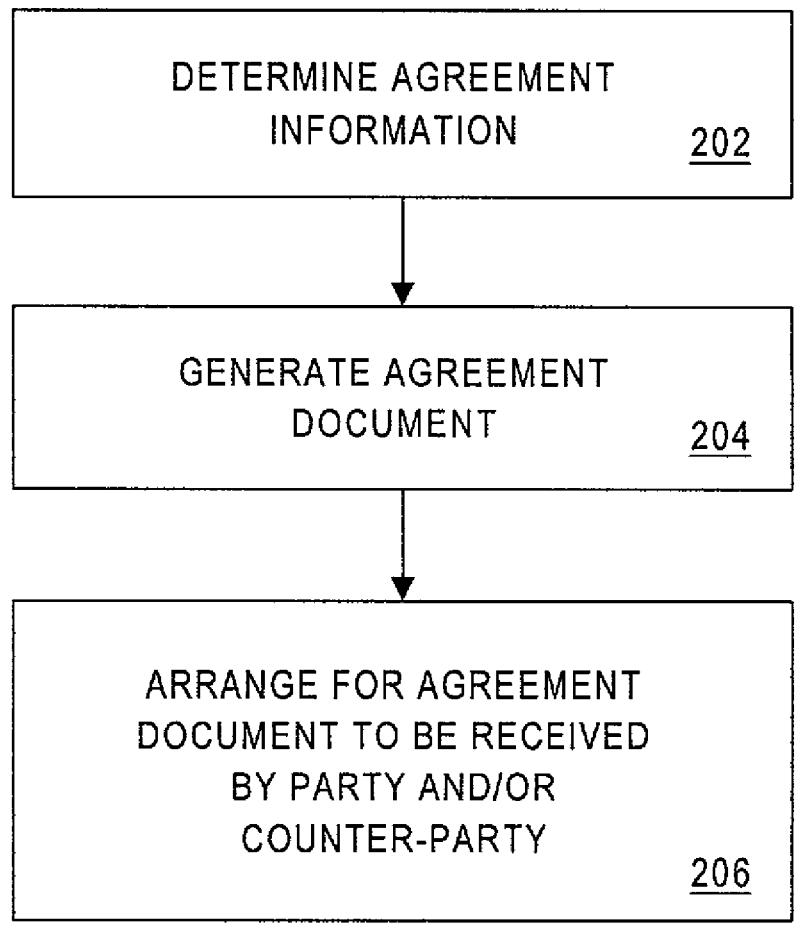
FIG. 2 is a flow chart of a method according to some embodiments of the present invention.

FIG. 2 is a flow chart of a method according to some embodiments of the present invention. The flow charts in FIG. 2 and the other figures described herein do not imply a fixed order to the steps, and embodiments of the present invention can be practiced in any order that is practicable. The method shown in FIG. 2 may be performed, for example, by the agreement modeling system controller 1000.

At 202, agreement information is determined. For example, a user may input information via the client device 10 indicating one or more financial products that will be associated with a contract. The agreement modeling system controller 1000 may then determine an appropriate contract type based on those financial products.

At 204, an agreement document is generated. For example, the agreement modeling system controller 1000 may generate a word processing file (e.g., a MICROSOFT WORD® file) based on the determined agreement information.

At 206, it is arranged for the agreement document to be received by a party and/or a counter party. For example, the agreement modeling system controller 1000 may automatically transmit a word processing file to the client device 10 or the counter-party device 15 (e.g., by publishing the document via a secure Web page).

Agreement Modeling System Architecture

Figure 3:
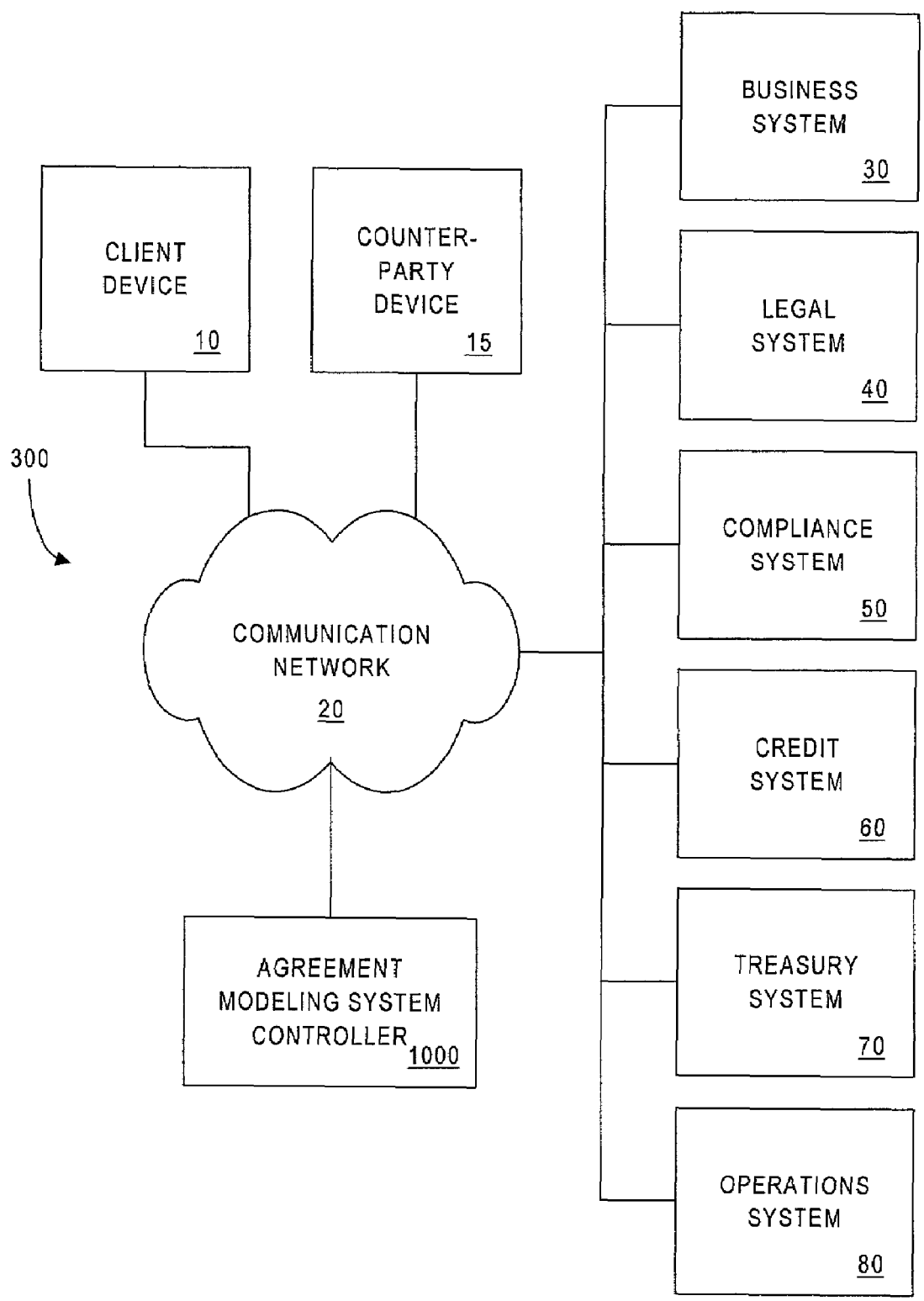
FIG. 3 is a block diagram overview of an agreement modeling system according to another embodiment of the present invention.

FIG. 3 is a block diagram overview of an agreement modeling system 300 according to another embodiment of the present invention. As in FIG. 1, the agreement modeling system controller 1000 communicates with the client device 10 and the counter-party device 15. As used herein, devices (such as the agreement modeling system controller 1000, the client device 10, and the counter-party device 15) may communicate via a communication network 20, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. As used herein, the term "communications" can refer to wired and/or wireless communications as appropriate. Note that the devices shown in FIG. 3 need not be in constant communication. For example, the agreement modeling system controller 1000 may communicate with a client device 10 and/or a counter-part device 15 on an as-needed or periodic basis.

Although a single agreement modeling system controller 1000 is shown in FIG. 3, any number of agreement modeling system controllers 1000 may be included in the agreement modeling system 300. Similarly, any number of client devices 10, counter-party devices 15, or any other device described herein may be included in the agreement modeling system 300 according to embodiments of the present invention.

The agreement modeling system controller 1000, the client device 10, and the counter-party device 15 may be any devices capable of performing the various functions described herein. A client device 10 or a counter-party device 15 may be, for example: a Personal Computer (PC), a portable computing device (e.g., a laptop computer), a Personal Digital Assistant (PDA), or a dedicated agreement modeling system 300 terminal. Note that a client device 10 or a counter-party device 15 may be associated with a full-blown workstation application or a thin-client browser-based application.

According to one embodiment, a user enters information associated with an agreement (e.g., information associated with an agreement type, an agreement term, and/or an agreement fact) via the client device 10. The agreement may be, for example, associated with financial transactions between a party and a counter-party. In this case, the user may enter information about the party, the counter-party (e.g., a name and communication address associated with the counter-party device 15), and/or the financial transactions via the client device 10 (e.g., by selecting a number of different financial instruments that will be involved in transactions between the parties).

Information associated with the agreement may then be transmitted from the client device 10 to the agreement modeling system controller 1000 via the communication network 20, and the agreement modeling system controller 1000 may process the information to generate one or more agreement documents. According to one embodiment, the agreement modeling system 1000 also communicates with one or more satellite systems, such as a business system 30, a legal system 40, a compliance system 50, a credit system 60, a treasury system 70, and/or an operations system 80 to facilitate definition and/or generation of the agreement documents. For example, the agreement modeling system controller 1000 may review information provided by the user and determine that an agreement requires approval via a credit system 60. Note that the agreement modeling system controller 1000 may communicate with the client device 10, the counter-party device 15, and one or more satellite systems via a single communication network or via multiple communication networks.

In addition to receiving information from the client device 10 and/or the satellite systems, the agreement modeling system controller 1000 may determine information associated with an agreement using a covered product matrix (as described in detail with respect to FIGS. 12 through 14), a pre-stored default transaction term (e.g., representing industry "best practices"), and/or information received from a "legacy" agreement system.

According to some embodiments of the present invention, a user also provides a communication address to which an agreement document should be transmitted. The communication address may be, for example, an electronic mail address (e.g., associated with the counter-party device 15 or the legal system 40), an Internet address, a Uniform Resource Locator (URL) address, or a telephone number (e.g., associated with a facsimile machine). The agreement modeling system controller 1000 may then automatically transmit the agreement document to the communication address once the document is generated and/or approved.

According to some embodiments, an agreement document is transmitted to a number of different devices (e.g., to the credit system 60, the treasury system 70, and the counter-party device 15) in either a parallel or sequential fashion (e.g., the document may be forwarded after a satellite system approves the agreement document or provides additional information).

The agreement modeling system controller 1000 may generate and/or transmit either a final agreement document or a preliminary agreement document. In the case of a preliminary agreement document, the agreement modeling system controller 1000 may also receive revisions to the document (e.g., from the client device 10, a satellite device, or even the counter-party device 15). The agreement modeling system controller 1000 may then reconcile the revised preliminary agreement document and the preliminary agreement document (e.g., by searching for changes and seeking the appropriate approval) and generate a final agreement document in accordance with this reconciliation.

Figure 4:
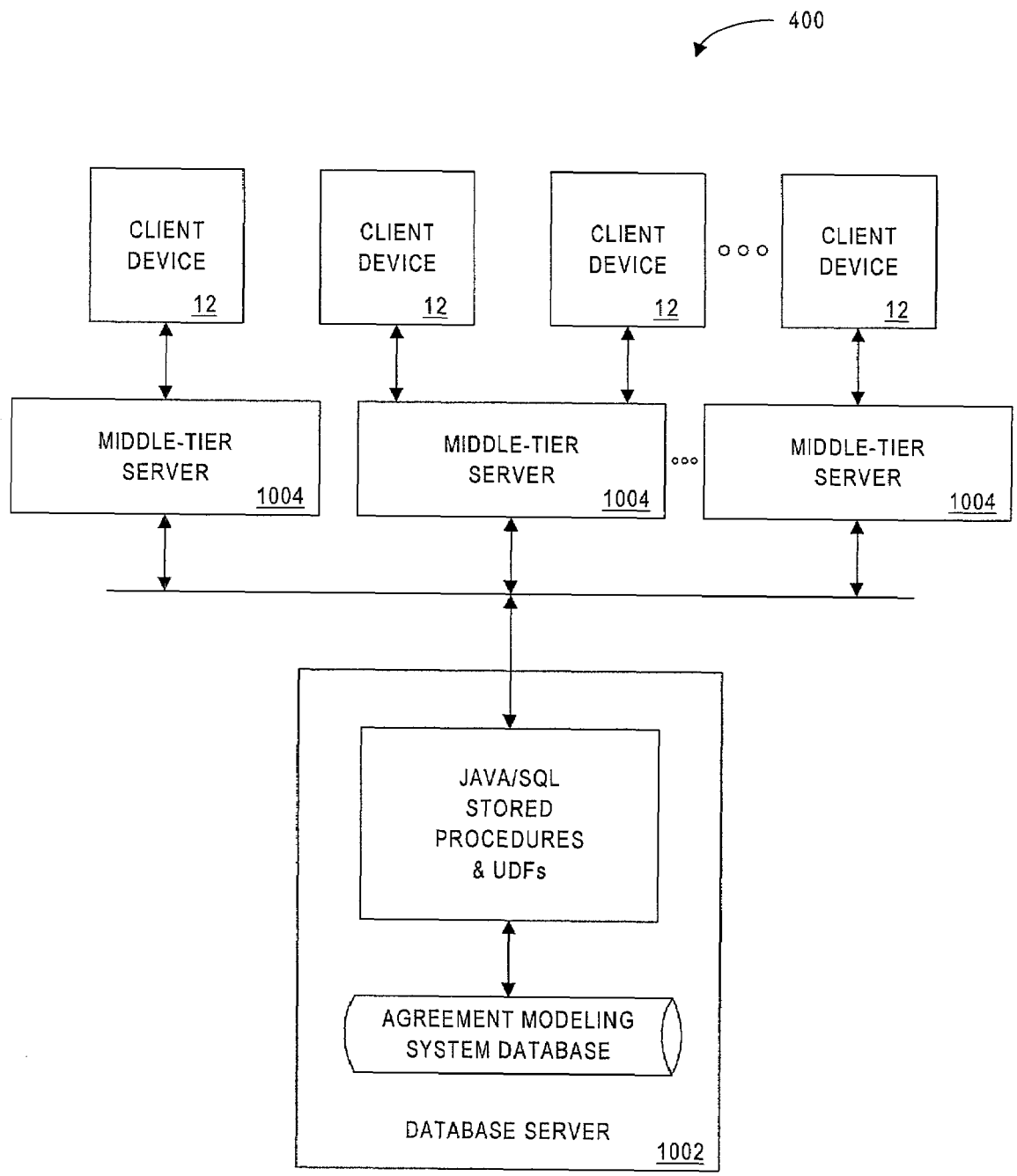
FIG. 4 is a client-server diagram overview of an agreement modeling system according to some embodiments of the present invention.

FIG. 4 is a client-server diagram overview of an agreement modeling system 400 according to some embodiments of the present invention. As shown in FIG. 4, a database server 1002 communicates with a number of middle-tier servers 1004. In turn, each middle-tier server 1004 communicates with one or more client devices 12.

The database server 1002 may include (or communicate with) an agreement modeling system database, such as a database that stores agreement information. The database server 1002 may also include Java and Structured Query Language (SQL) stored procedures along with User Defined Functions (UDFs). The database server 1002 can act as a "back-end" to the agreement modeling system 400 and manage user connections (e.g., by invoking stored procedures in and out, validating client logons, establishing client access rights, and/or maintaining a list of connected clients). The database server 1002 may also perform concurrency management (e.g., by responding to client timeout or disconnect notifications from middle-tier servers 1004, releasing check-out locks, updating access modes, and managing access modes and check-out locks on agreements, facts, or fact sets as described, for example, with respect to FIG. 6). In addition, the database server 1002 may manage Extensible Markup Language (XML) and Application Program Interface (API) information (e.g., by managing special Java XML API entry point stored procedures, interpreting incoming XML streams, performing appropriate XML operations, returning appropriate response XML packets, and/or retrieving agreement information using XML streams).

The middle-tier servers 1004 may comprise, for example, SILVERSTREAM® or WEBLOGIC® servers that manage user connections (e.g., via special login and logout servlet interfaces and/or by establishing logins and logouts with the database server 1002). The middle-tier servers 1004 may also perform session management (e.g., by handling timeouts and disconnects and notifying the database server 1002 when a client device 12 has timed-out or disconnects) and/or manage database connections (e.g., by optimizing and pooling database connections and providing XML user and session identification packets associated with XML packets sent to the database server 1002). The middle-tier servers 1004 may also perform XML API management (e.g., using a special XML API servlet interface that serves as a pass-through for XML packets sent to the database server 1002 via calls to a Java stored procedure).

A client device 12 may, for example, control user functionality (e.g., by supporting applicable user interactions). The client device 12 may also perform session management (e.g., by providing user login and logout capability, managing a physical connection including a connection status notification to a user, and issuing a logout when appropriate) and manage XML API interactions (e.g., by interacting with an XML API back-end via correctly formed XML packets, and/or managing incoming XML API response packets returned from XML API calls).

This hierarchical arrangement (e.g., having a client tier, a middle tier, and a database tier) may let a significant number of client devices 12 access and utilize the database server 1002.

Figure 5:
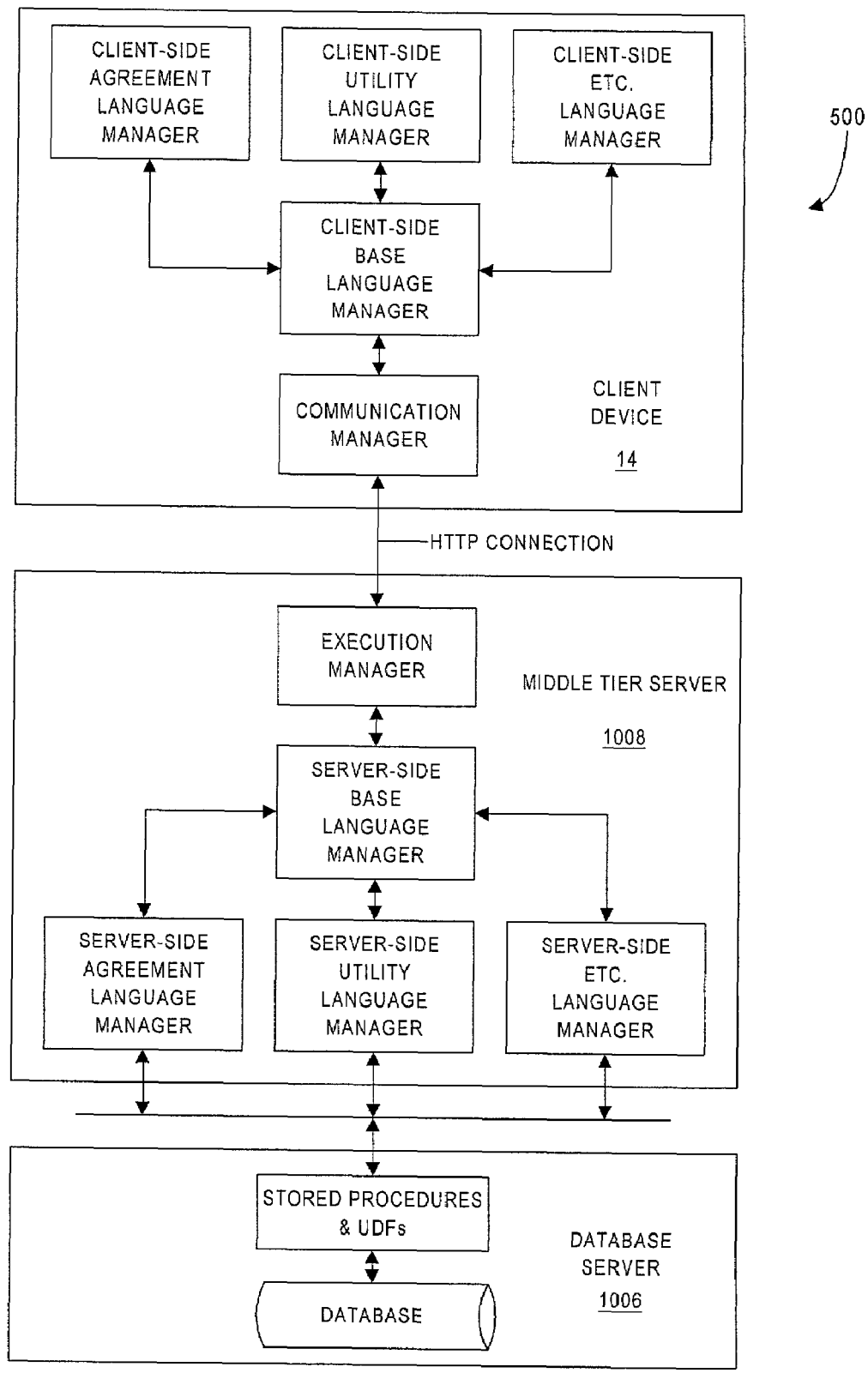
FIG. 5 is a more detailed diagram of an agreement modeling system according to an embodiment of the present invention.

FIG. 5 is a more detailed diagram of an agreement modeling system 500 according to one embodiment of the present invention. As shown in FIG. 5, a database server 1006 communicates with a middle-tier server 1008. In turn, the middle-tier server 1008 communicates with a client device 14.

The database server 1006 may, for example, provide support for an API via stored procedures and UDFs. The database server 1006 may also manage persistence of agreement information and API states for the agreement modeling system 500 in a database.

The middle-tier server 1008 may communicate with the database server 1006 via a number of server-side language managers, such as an agreement and/or a utility language manager. The server-side language managers may, for example, implement interfaces similar to those provided on the client side to provide specific API functionality. These managers may be registered with an execution manager indicating supported interfaces. Instances of the server-side language managers may be instantiated to service incoming API method calls. The managers may also provide implementation of the API method calls by interacting directly with the agreement database via stored procedure calls.

The server-side language managers may communicate with the execution manager via a server-side base language manager that routes method calls and provides implementation of common API methods.

The execution manager may exchange information with a communication manager associated with the client device 14 via a Hyper-Text Transfer Protocol (HTTP) connection. In addition, the execution manager may be delegated to by middle-tier servlets that process HTTP requests and responses. The execution manager may also handle all incoming API "method calls" and interact with the service-side base language manager to service those calls. Moreover, the execution manager may be responsible for the registration of server-side language managers, "de-serializing" XML method call packets, routing methods to the appropriate registered server-side language manager, "serializing" return values or errors into XML packets, and/or forwarding return values or errors back to the client device via an HTTP response.

The communication manager in the client device 14 interacts with a client-side base language manager and the middle-tier servlets. The communication manager is responsible for managing the connection with the server, the invocation of method calls by passing a stream to the server, the receiving return values or errors back as a stream, and/or propagating up return values or errors to the language manager layer. Both synchronous and asynchronous method calls may be supported at this layer.

The client-side base language manager may define a base class from which extended client-side language managers are derived. Common functionality may be implemented in the base class, including a standard set of API method calls. The client-side base language manager may also be responsible for interacting with the communication manager to process method calls forwarded by derived client-side language managers.

The client side base language manager communicates with a number of client-side language managers, such as an agreement and/or a utility language manager. The client-side language managers may implement interfaces providing specific API functionality to the client device 14. The API methods in the client application may be called like any other local method. The derived client-side language managers may be responsible for serializing method calls into XML packets and/or interacting with the client-side base language manager to process the call.

Agreement Modeling System Information Architecture

In order to define an agreement, the facts that are associated with the agreement need to be captured. However, different agreements may not be equal in terms of data content, and thus a flexible database design (e.g., capable of capturing a variety of data while maintaining relative data context) may be required to allow for effective and reliable agreement definition, generation, and/or utilization (e.g., via agreement information data queries).

Figure 6:
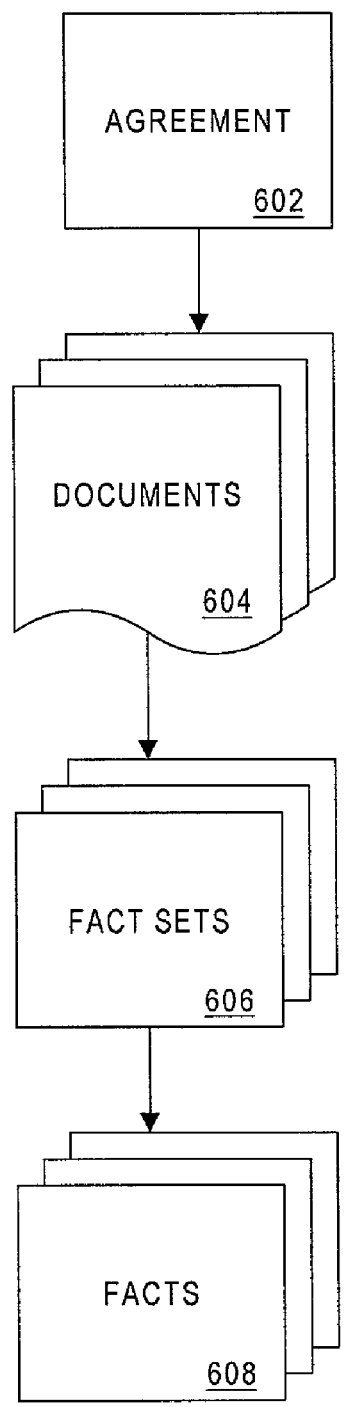
FIG. 6 is an information architecture overview associated with an agreement modeling system according to some embodiments of the present invention.

To achieve this end, the agreement modeling system may utilize a modeling language by which agreement content and context can be described without re-coding the database. FIG. 6 is an information architecture overview associated with one such embodiment of the present invention. As can been in FIG. 6, the information architecture is associated with a hierarchical view of agreement information. In particular, an agreement 602 is viewed as a set of related documents 604. Each document 604 comprises one or more fact sets 606, and each fact set 606 includes a number of related facts 608 (e.g., single pieces of information). Thus, the information architecture may apply structure to information through the constructive use of well-known fact sets 606 and data definitions that are applied to facts 608, and taken together, data context may be maintained.

According to one embodiment, the agreement 602 is associated with an "original" document instance containing facts 608 that define the agreement 602 upon creation. As additional information is created (e.g., the original agreement 602 is amended), additional documents 604 may be added to define the facts 608 that apply at particular points in time.

For example, a document 604 may be created that "overrides" existing facts 608 in an agreement 602 for a specified period of time and/or that adds new facts 608 that extend existing facts 608. In either case, the added document 604 may now be considered to determine a complete set of agreement facts 608 (e.g., via an agreement modeling system query).

According to one embodiment, documents 604 may be categorized according to a single document type name and any number of document type facts that further refine the documents classification. By way of example, the document type name may indicate a basic category of agreement types (e.g., a financial instrument swap agreement or an over-the-counter financial instrument agreement) and the document type fact (or facts) may further categorize a document's relationship to an agreement (e.g., a credit support annex or an amendment to an existing agreement 602).

A document 604 contains instances of fact sets 606, and a fact 608 may belong to an instance of a fact set 606. Fact set definitions (in addition to document definitions) may exist outside of any agreement, and their definition and fact content may be described via an agreement modeling language.

By way of example, a fact 608 may be associated with a party name, a party address, a term date, a country of origin, an indication of governing law (e.g., "Delaware law applies to all transactions associated with this agreement"), or any other information associated with an agreement. A fact set 606 may comprise, for example, a counter-party fact set including a counter-party name and address.

Note that fact sets 606 can be single-instance or multi-instance. In either case, a fact 608 belonging to a fact set 606 may be related to the other facts 608 in that fact set 606. A multi-instance fact set 606 enables the repeated instantiation of the same set of facts 608, typically with different values being associated with the different instantiated facts 608. An instance of a multi-instance fact 606 set is analogous to a row of data in a conventional database table, and the facts 608 are analogous to columns. Note, however, that the table is not statically defined—rather it is dynamically defined via the agreement modeling language.

A fact 608 in the agreement modeling system may have pre-defined attributes that describe the fact's nature and meaning. For example, each fact 608 may have an associated data type that defines a set of potential values and/or data input behavior. A fact 608 may be considered "internal" or "external," and external facts may map to information in other databases (i.e. external databases). In addition, other attributes may be applied to facts 608 to help to define context.

Figure 7:
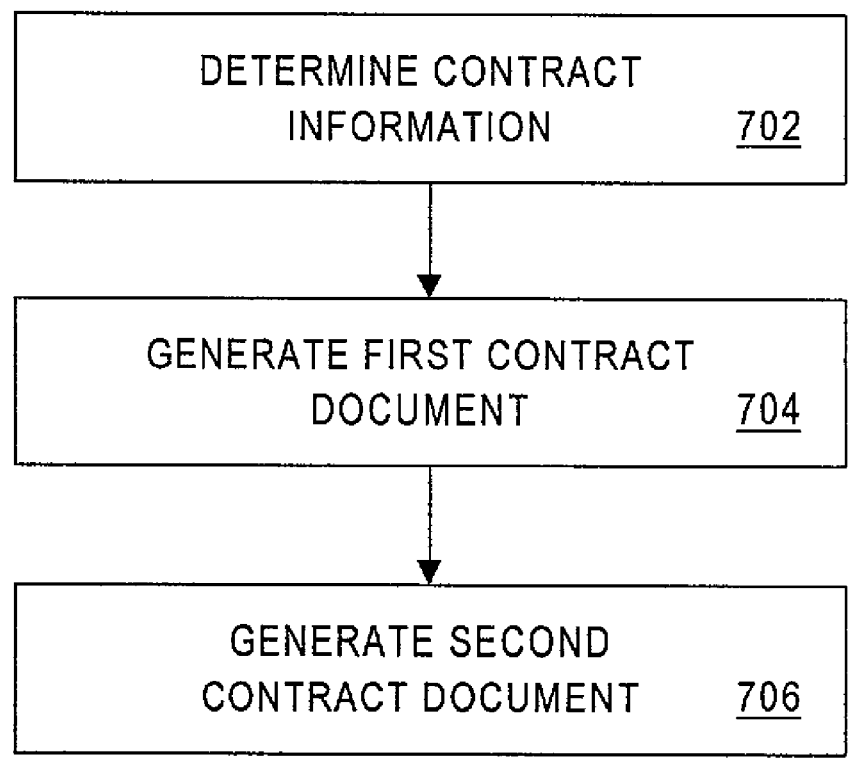
FIG. 7 is a flow chart of a method for generating a plurality of contract documents according to some embodiments of the present invention.

FIG. 7 is a flow chart of a method for generating a plurality of contract documents according to some embodiments of the present invention. At 702, contract information is determined. The contract information may represent, for example, an agreement type, a document type, fact sets, and/or facts. At 704, a first contract document is generated in accordance with the agreement information. Similarly, a second contract document is generated at 706. The agreement modeling system controller 1000 may also arrange for the first and/or second contract documents to be received by appropriate parties (e.g., the first contract document may be transmitted to a first counter-party communication address and both contract documents may be transmitted to a second counter-party communication address).

Figure 8:
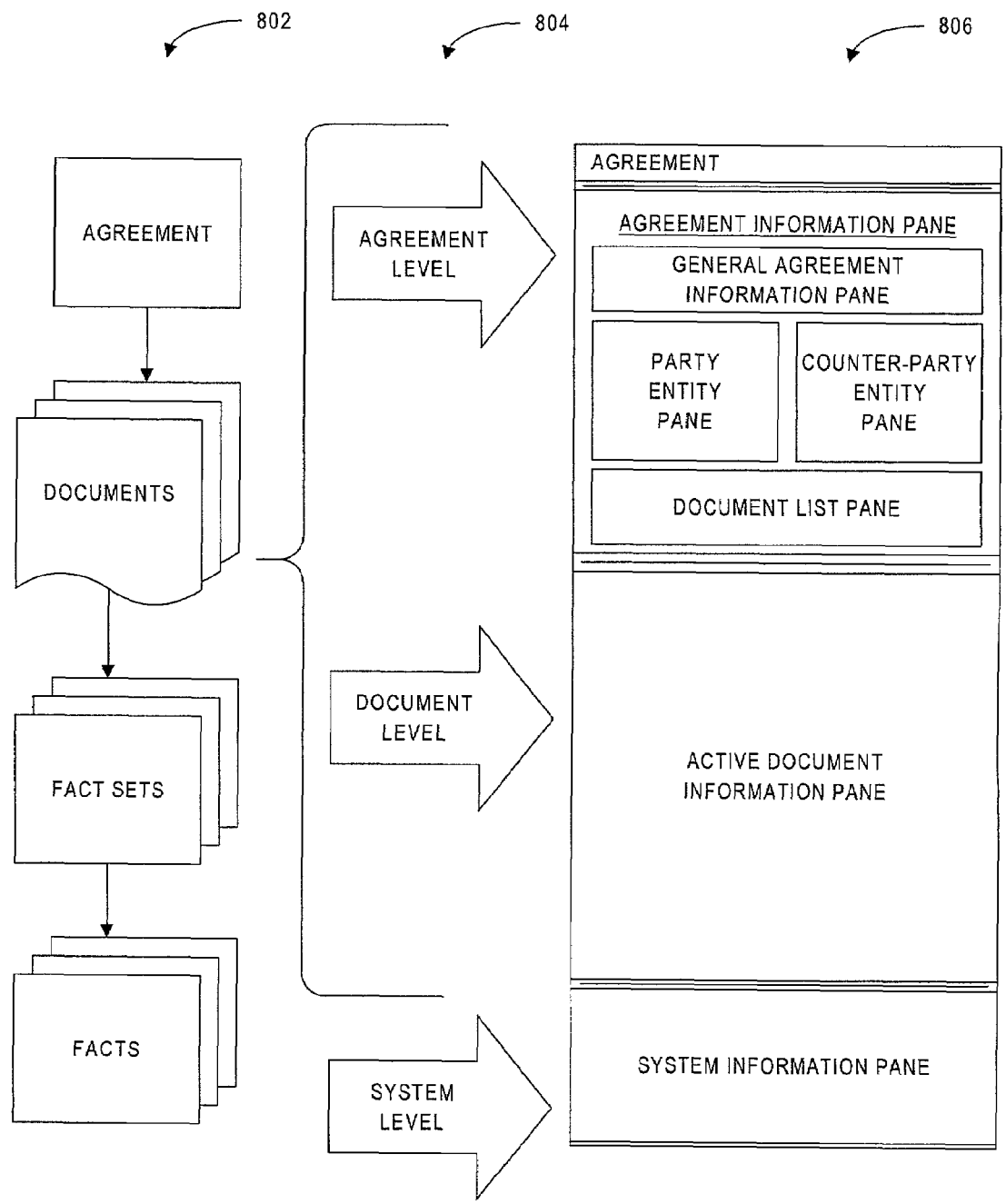
FIG. 8 illustrates various representations of agreement modeling system information according to an embodiment of the present invention.

FIG. 8 illustrates various representations of agreement modeling system information according to an embodiment of the present invention. To provide flexibility, agreement information may be stored via an extensible agreement modeling system language. For example, an XML or Standard Generalized Markup Language (SGML) data format may be used to store information as follows:

```
<Agreement>
    <Document>
        <Fact set>
            <Fact>
            </Fact>
            . . .
        </Fact set>
        . . .
    </Document>
    . . .
</Agreement>
```

Such an approach may let the system model dynamic information (e.g., document and fact set information) and facilitate communication of dynamic agreement information between a client and a server. In addition, the implementation may be technology neutral (e.g., the information may be provided to or accessed by a number of different technologies). Moreover, facts may be associated with attribute information, such as a data name, a data prompt, a data type, a security attribute, and/or a display attribute.

The relationships between an information architecture 802, an XML representation 804, and a display 806 are illustrated in FIG. 8. For example, document level information may be mapped to a particular XML representation (e.g., <Document spec="ORIGINAL|MASTER" id="2" . . . >, which in turn may be rendered by an agreement application display engine (e.g., via a document list pane and/or an active document information pane).

Agreement Modeling System Operation

Figure 9:
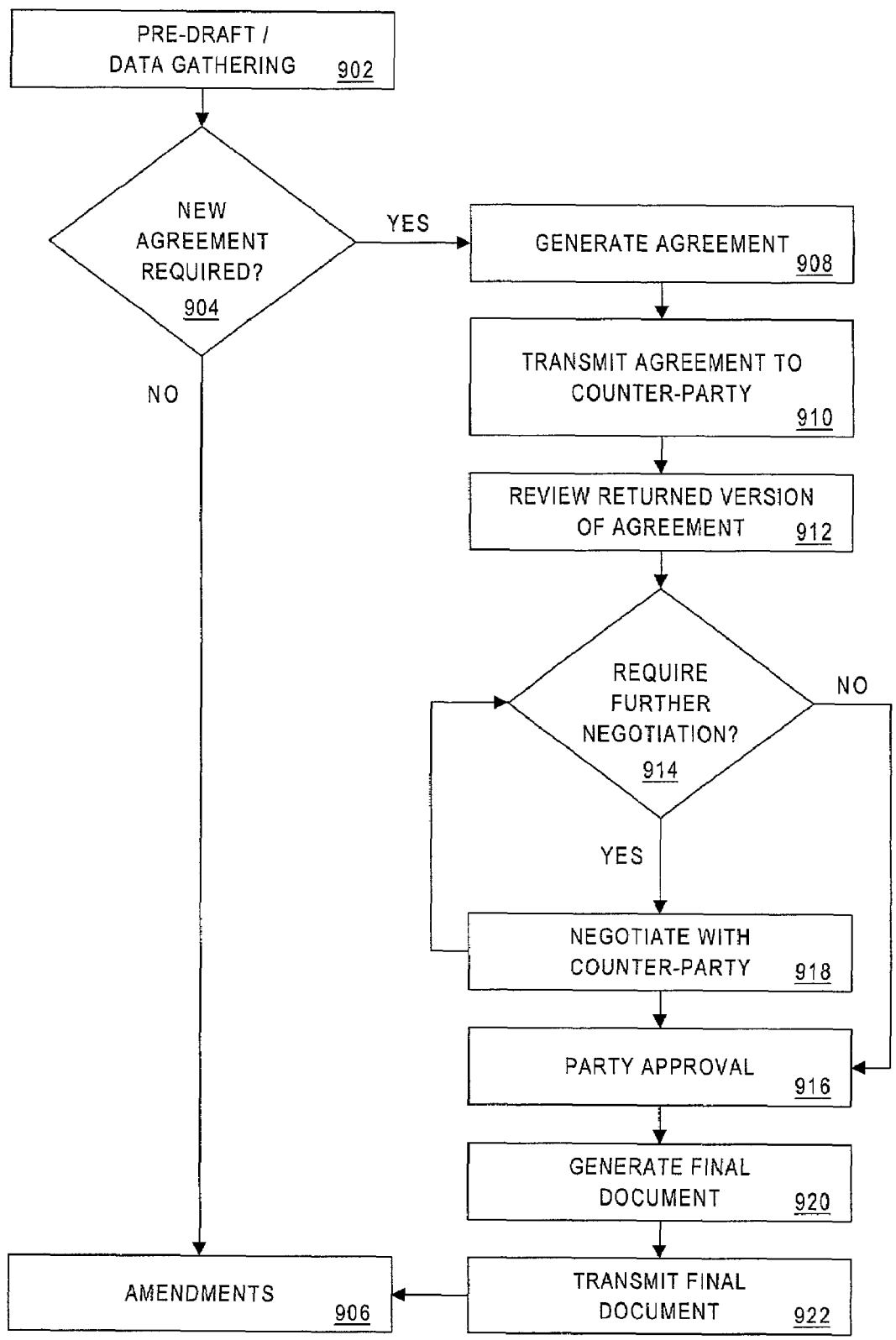
FIG. 9 is a flow chart of an agreement modeling system method according to some embodiments of the present invention.

FIG. 9 is a flow chart of a method according to some embodiments of the present invention. At 902, information associated with an agreement is gathered. For example, the agreement modeling system controller 1000 may gather information associated with a financial transaction agreement between a party and a counter-party via one or more client devices 10 and/or satellite systems.

At 904, it is determined if a new agreement is required. According to one embodiment, a request for a new agreement may be generated by a satellite system, such as the business system 30, the credit system 60, and/or the treasury system 70.

By way of example, a user associated with the business system 30 may populate a new agreement request form via a Web-based interface provided by the agreement modeling system 1000. The new agreement request form may include, for example, a set of "required" information, such as: a name of a sales person covering an account, a selected entity master (e.g., via a drop-down list of party entities that the counter-party is contemplating doing business with), a business desk (e.g., an indication of "Fixed Income," "Equity," or "Commodities" which may be automatically generated based on a user identifier), a counter-party legal name (e.g., selected from a drop-down list), contact information of a person with whom documentation will be exchanged (e.g., a name, a phone number, and/or a facsimile number), one or more products to be traded (e.g., associated with a covered products matrix), an indication of whether or not the agreement is bilateral (e.g., two-way agreements may require special processing via the treasury system 70), an anticipated trade date, an indication of whether or not the agreement will be used as a marketing tool.

The new agreement request form may also include information that will be required when appropriate (e.g., based on the particular agreement being requested), such as a type of agreement (e.g., selected from a drop-down list) and/or an investment advisor. The new agreement request form may also include optional information, such as an electronic mail address associated with the counter-party.

As indicated above, some information may be selected by a user via a drop-down list (e.g., a counter-party name or identifier). In some cases, however, the desired information may not be present in the drop-down list (e.g., when a new counter-party is desired). In this case, a user may be asked to complete another form (e.g., a new counter-party request form) or he or she may simply enter the information manually (e.g., via free form text). Also note that one or more satellite systems may be involved in this process (e.g., the compliance system 50 may approve new counter-parties).

After the new agreement request form is submitted by the user, the agreement modeling system controller 1000 determines if a new agreement is actually required at 904. For example, the agreement modeling system controller 1000 may execute a query to ensure that there are no other existing agreements in place and return the results of the query to the user (e.g., by indicating that "there are existing agreements that cover this request"). If no new agreement is required at 904 (e.g., an appropriate existing agreement is found by the agreement modeling system controller 1000), one or more amendments to the existing agreement may be facilitated at 906. For example, the agreement modeling system controller 1000 or the compliance system 50 may determine that an existing agreement can be used to cover a transaction by broadening a compliance covered products scope term in the existing agreement. In this case, an electronic mail message may be transmitted to the legal system 40 asking if the agreement scope can be broadened accordingly. The legal system 40 may then indicate to the business system 30 that the transaction can be covered under the existing agreement. On the other hand, the legal system 40 may instead indicate that a new agreement is required.

If a new agreement is required at 904 (e.g., no appropriate existing agreement is found by the agreement modeling system controller 1000), the new agreement request form is processed by the agreement modeling system controller 1000. According to one embodiment, the processing of the new agreement request form also involves one or more satellite systems. For example, the compliance system 50 may receive the request via an automated workflow and provide information as required. In this case, the compliance system 50 may advise the legal system 40 as to the types of products the counter-party is authorized to trade, and with which party entity the counter-party may trade these products.

To make such a decision, the compliance system 50 may need to access information about the agreement, such as the counter-party name or identifier, a master agreement type, a current status of the master agreement type, a date of agreement, a document identifier, an investment advisor, and/or a security agreement type.

In addition to accessing information, the compliance system 50 may define facts for the agreement, such as: a compliance officer name responsible for the account, a party entity approved for the business, a covered products matrix indicating the authorized products the counter-party can or can't trade, and/or one or more supporting authority documents.

When the compliance system 50 finishes providing information, the form may be forwarded to the credit system 60 (e.g., if the agreement is associated with a risk transaction) to provide still more information. Such information may include, for example, collateral terms such as: a credit officer name responsible for the account, terms of a collateral agreement (e.g., bilateral, party post, or counter-party post), an independent amount (e.g., an initial margin percentage or dollar amount associated with notional amount), a threshold amount (e.g., a trigger value associated with a specified dollar amount or a ratings table), a minimum transfer amount, a rounding amount, and/or a base currency.

The credit system 60 may also provide non-collateral terms, such as: default information (e.g., bankruptcy information or credit event upon merger information), a cross acceleration threshold amount for the counter-party, and/or one or more credit-related additional termination events (e.g., adequate assurance, amendment of constituent documents, break clause, credit rating downgrade, decline in partners capital, governmental moratorium on debt declared, investment advisor event, material adverse change, modification to guaranty, net asset value information, ownership maintenance, redemption of notes, termination of trust under trust agreement, termination rights linked to separate agreement, transactions not covered by guaranty and/or guarantor, or withdrawal of general partners or key employees).

The credit system 60 may also indicate one or more credit support documents referenced under the agreement, such as: a comfort letter, a deed poll guarantee, an indemnity agreement, a Keepwell agreement, a letter of commitment, a letter of credit, a security trust deed, a senior facility agreement, a supplemental trust deed, a support agreement, and/or a swap surety bond/insurance policy.

In addition to the credit system 60, the treasury system 70 may provide information associated with bilateral agreements, such as an indication of approval, a threshold amount, a notional amount, eligible collateral types (e.g., United States Treasury bills, highly liquid pools, AAA bonds, residuals, commercial paper, investment grade corporate instruments, preferred stock, municipals, emerging market debt, Brady bonds, high yields, non-distressed issues, distressed issues, bank debt, par, whole loans, residential, commercial, and/or short-term mortgage backed bank notes), equities (e.g., United States or United Kingdom listed equities, foreign convertibles-investment grade, foreign convertibles-high yield, listed mutual funds, rights and warrants, or options), commodities (e.g., metals or energy), interest paid on cash collateral, base currency on cash, tri-party custodial relationships, notification time, amendments to transfer provision (e.g., after approval by the legal system 40).

According to one embodiment, the processing of multiple new agreement request forms may be prioritized (e.g., based on a date on which a request was made, a date associated with a pending trade, or a number of requests in a queue for a given business area).

Referring again to FIG. 9, after it is determined at 904 that a new agreement is needed, an agreement document is generated by the agreement modeling system controller 1000 at 908. For example, the agreement modeling system controller 1000 may use a rule set to route the new agreement request form to an appropriate functional group within the legal system 40 based on a product type and/or a party entity. Moreover, an agreement type (e.g., an ISDA® master agreement schedule, a club letter, or a credit support annex in accordance with New York law) may be determined based on one or more rules by the legal system 40 or the business system 30. According to one embodiment, a user has the ability to override an agreement type chosen by the system.

According to some embodiments, the legal system 40 can access the generated agreement on-line to review the agreement's structure and to make revisions, if required. The legal system 40 may also prepare the agreement for transmission. If desired, the legal system 40 may be prevented from changing or over-riding data that was originally provided via the new agreement request form.

The agreement modeling system controller 1000 may then automatically create the agreement document along with, according to one embodiment, one or more supporting documents (e.g., a power of attorney, a legal opinion, a pre-executed request guarantee, and/or a cover letter).

The user or the agreement modeling system controller 1000 then transmits the agreement document or documents to the counter-party at 910. For example, a user may manually print hard copies of the agreement to send via a delivery service (e.g., FED EX®). According to another embodiment, the agreement modeling system controller 1000 automatically sends a facsimile or an electronic message attachment of the agreement document in an unalterable format (e.g., a "pdf" file) to the counter-party. In this case, the system may also provide the user with an automated notification that the document has been successfully transmitted. According to another embodiment, the agreement is published via a URL address that enables the counter-party to securely view the agreement.

According to some embodiments, agreement information (e.g., an agreement document) is transferred to the counter-party in a medium that allows the counter-party to alter the contents of the agreement to reflect agreement terms desired by the counter-party. The altered agreement content can then be automatically extracted from the medium by the agreement modeling system controller 1000 and the differences may be transmitted to the appropriate functional areas to move a negotiation forward. Examples of such an appropriate medium include a MICROSOFT WORD® file, an ADOBE® "pdf" file, and information delivered to the counter-party via a Web page (e.g., in HTML or XML format).

According to one embodiment, the agreement modeling system controller 1000 determines that an agreement will not be automatically generated and/or transmitted. This may be the case, for example, when a data field in the new agreement request form requires a change (e.g., a name change or a policy change). Similarly, it may be determined that a counter-party form of the agreement will be used, that supervisory review is required (e.g., based on a functional group associated with the agreement), or that the business system 30 has asked that the generation or transmission be postponed.

The counter-party may the respond to the draft agreement (e.g., altering a MICROSOFT WORD® or ADOBE® file to indicate an adjusted agreement term). According to one embodiment, the counter-party returns a hard copy of an altered agreement. In this case, the hard copy may be scanned and stored via an Optical Character Recognition (OCR) application. The counter-party may instead contact the party via telephone to verbally confirm the terms of the agreement or advise of any discrepancies between the counter-party's view and party's view of the agreement. In this case, the agreement modeling system controller 1000 may store the name of the person who called and the time, date, and substance of the conversation.

Any changes proposed by the counter-party are then reviewed at 912. For example, discrepancies may be determined and routed to the appropriate party entities for reconciliation (e.g., by routing the information to an appropriate information owner based on a functional group or a document type).

If the changes proposed by the counter-party do not require further negotiation at 914 (or the counter-party has simply approved the draft agreement), the system waits for approval by the party at 916. If the changes proposed by the counter-party do require further negotiation at 914, negotiations continue until the differences are resolved at 918.

When both the counter-party and the party (including any entities associated with the party) have approved the agreement, a final document is generated at 920 and transmitted to the appropriate parties for execution at 922. For example, two hard copies of a fully negotiated ISDA® schedule and boilerplate may be printed and forwarded to the counter-party for signature. In addition, a cover letter with instructions to the counter-party may be automatically generated along with any required tax documents.

The counter-party can then return the signed agreement via hard copy, electronic mail, facsimile, a URL, or any other agreed upon medium for document exchange. The counter-party may also provide any supporting documentation (e.g., a power of attorney). The date that the agreement was executed may be recorded by the agreement modeling system controller 1000 along with, for example, a date on which the agreement is effective (which may or may not be the same as the execution date). Any subsequent amendments to the agreement may then be made at 906. Note that the agreement modeling system controller 1000 extends the same capabilities of automatic document negotiation and generation (described herein) with respect to an amendment to an existing agreement.

Agreement Modeling System Controller

Figure 10:
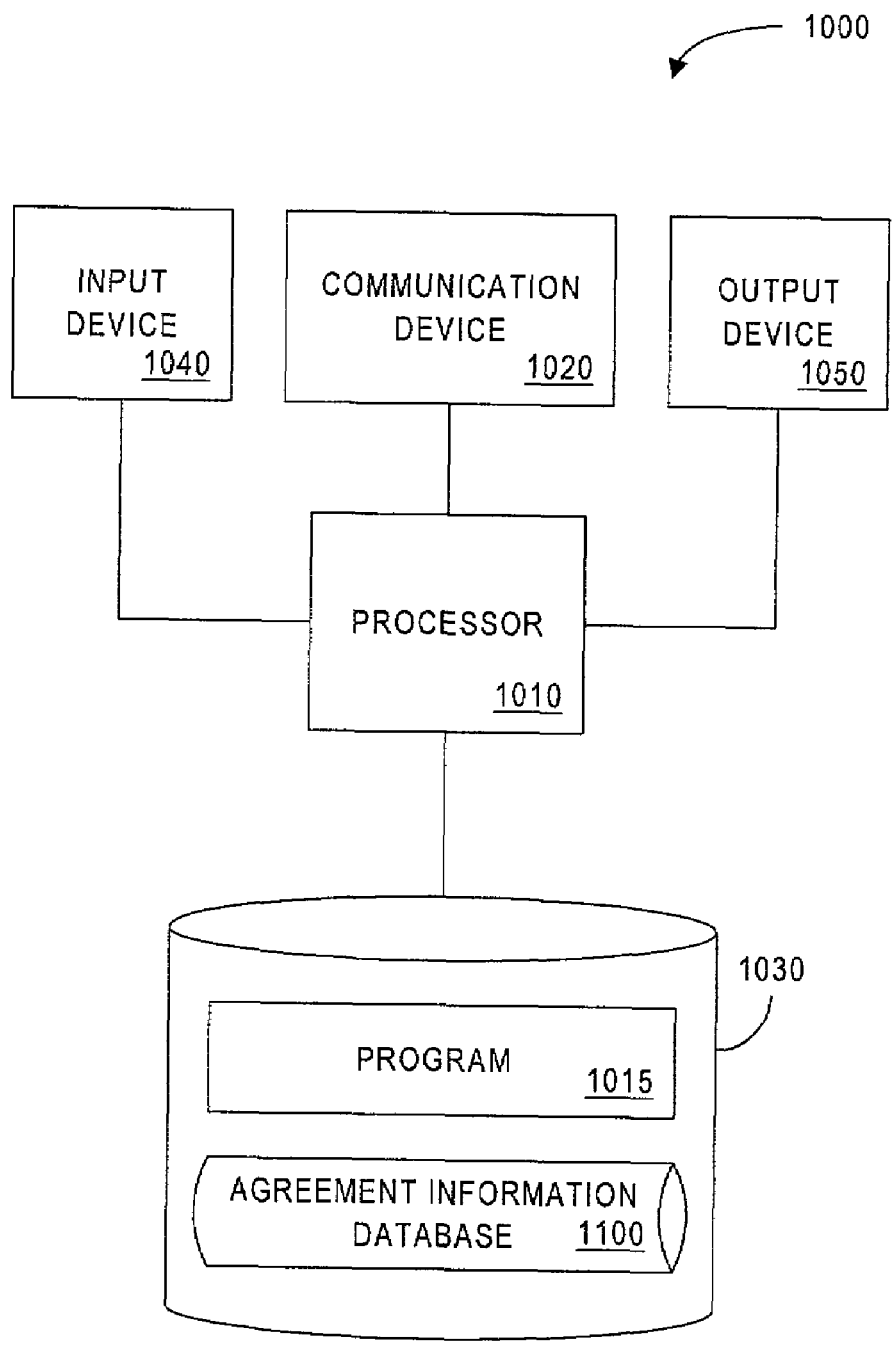
FIG. 10 is a block diagram of an agreement modeling system controller according to an embodiment of the present invention.

FIG. 10 illustrates an agreement modeling system controller 1000 that is descriptive of the devices shown, for example, in FIGS. 1 and 3 according to some embodiments of the present invention. The agreement modeling system controller 1000 comprises a processor 1010, such as one or more INTEL® Pentium® processors, coupled to a communication device 1020 configured to communicate via a communication network (not shown in FIG. 10). The communication device

1020 may be used to communicate, for example, with one or more client devices 10 and/or satellite devices.

The processor 1010 is also in communication with an input device 1040. The input device 1040 may comprise, for example, a keyboard, a mouse or other pointing device, a microphone, knob or a switch, an IR port, a docking station, and/or a touch screen. Such an input device 1040 may be used, for example, to enter information (e.g., agreement information).

The processor 1010 is also in communication with an output device 1050. The output device 1050 may comprise, for example, a display (e.g., a display screen), a speaker, and/or a printer. The output device 1050 may be used, for example, output agreement information (e.g., a final version of an agreement to be executed).

The processor 1010 is also in communication with a storage device 1030. The storage device 1030 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 1030 stores a program 1015 for controlling the processor 1010. The processor 1010 performs instructions of the program 1015, and thereby operates in accordance with the present invention. For example, the processor 1010 may determine agreement information associated with an agreement between a party and a counter-party. The processor 1010 may also generate an agreement document in accordance with the agreement information, and arrange for the agreement document to be received by the party and/or the counter-party (e.g., by automatically transmitting the agreement document to a counter-party device 15).

According to another embodiment, the processor 1010 receives agreement information from a user, the agreement information including (i) a counter-party communication address and (ii) information about a financial instrument and/or a financial product associated with a financial transaction agreement. The processor 1010 then generates an agreement document in accordance with the agreement information and a covered products matrix. The processor 1010 also automatically transmits the agreement document to the counter-party via the counter-party communication address.

According to another embodiment, the processor 1010 determines contract information and generates a first contract document and a second contract document in accordance with the contract information.

The storage device 1030 also stores an agreement information database 1100. The illustration and accompanying description of this database is exemplary, and any number of other database arrangements could be employed besides those suggested by the figure.

Referring to FIG. 11, a table represents the agreement information database 1100 according to one embodiment of the present invention. The table includes entries identifying agreements that have been (or are being) generated by the agreement modeling system controller 1000. The table also defines 1102, 1104, 1106 for each of the entries. In particular, the table defines an agreement identifier 1102, an agreement type 1104, and a counter-party communication address 1106. The information in the agreement information database 1100 may be created and updated, for example, by the agreement modeling system controller 1000, a client device 10, a satellite device, and/or a counter-party device 15.

The agreement identifier 1102 may be, for example, an alphanumeric code associated with an agreement between a party and a counter-party. The agreement type 1104 describes the agreement. For example, the agreement may be an original master agreement or an amendment to an existing master agreement.

The agreement information database 1100 also stores a counter-party communication address 1106 for each agreement. After an agreement is generated, the agreement modeling system controller 1000 may transmit the appropriate documents via the counter-party communication address 1106. Note that a counter-party communication address 1106 may not be defined (e.g., the documents will be manually sent to the counter-party) or more than one counter-party communication address 1106 may be defined (e.g., a document may be broadcast to a number of communication addresses associated with the counter-party). According to another embodiment, one or more communication addresses associated with the party are also stored in the agreement information database 1100.

Agreement Modeling System Covered Products Matrix

Figure 12:
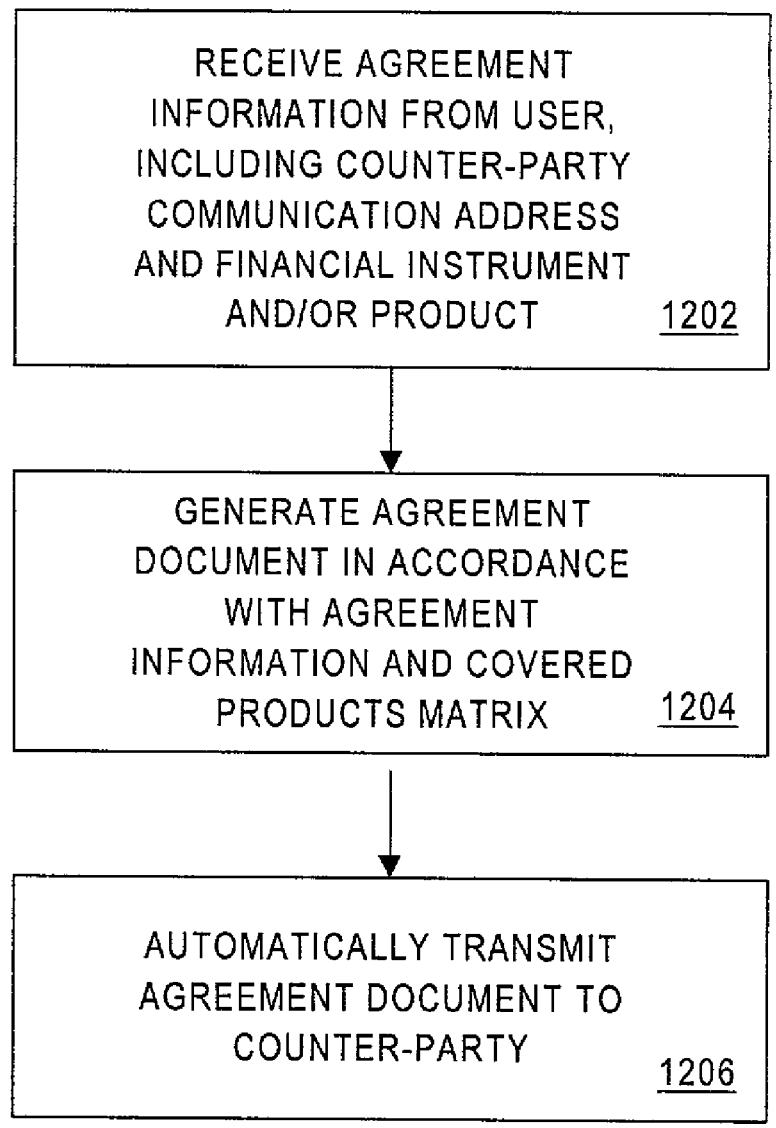
FIG. 12 is a flow chart of a method for generating an agreement document in accordance with a covered products matrix according to some embodiments of the present invention.

FIG. 12 is a flow chart of a method for generating an agreement document in accordance with a covered products matrix according to some embodiments of the present invention. The method may be performed, for example, by the agreement modeling system controller 1000 and may be associated with a transaction agreement defining a plurality of product types (e.g., a number of different financial products) and/or instruments (e.g., a number of different financial instruments).

At 1202, agreement information is received from a user. For example, the agreement modeling system controller 1000 may receive agreement information from a client device 10, including a counter-party communication address and an indication of a set of financial instruments and/or products that will be associated with an agreement.

At 1204, an agreement document is generated based on the plurality of product types (or instruments) and a "covered products matrix." As used herein, the phrase "covered products matrix" may refer to, for example, any stored indication of transaction instruments (e.g., swaps, options, and forwards) and product types (e.g., stocks, bonds, and credit derivatives) in connection with a particular agreement. Note that the stored information does not necessarily need to be in the form of a matrix or an array.

The agreement document (or documents) generated at 1204 may be associated with, for example, a set of rights between the party and the counter-party, a legal contract, a product type, a monetary amount, and/or a transaction instrument. According to one embodiment, the agreement type comprises a document type name (e.g., an ISDA® master agreement type) and one or more document type facts (e.g. further characterizing the document type).

One example of a covered products matrix is illustrated in FIG. 13. As shown in FIG. 13, an agreement may be associated with a number of different financial products. For example, an agreement may be associated with an equity instrument (e.g., a stock or index instrument), a fixed income instrument (e.g., a bond, a bank loan, or a credit derivative), and/or a commodity instrument (e.g., a precious metals instrument or a wheat commodity instrument). For each financial product, the agreement may further be associated with one or more financial instruments (e.g., a warrant or a buy-call option).

By way of example, a user may indicate that a particular agreement is going to be associated with (i) buy and sell options for gold commodities and (ii) swaps for silver commodities (i.e., as indicated as "Y" in FIG. 13). Based on this information, an appropriate agreement type may be determined by the agreement modeling system controller 1000.

When generating the agreement document, the agreement modeling system controller 1000 may determine one or more agreement terms between the party and the counter-party in accordance with an agreement type. For example, the agreement modeling system controller 1000 may determine a number of default agreement terms (e.g., default credit limits) associated with a particular agreement type. In general, the agreement term may be associated with, for example, a right between the party and the counter-party, a legal contract term, a product type, a monetary amount, and/or a transaction instrument.

Consider the covered products matrix illustrated in FIG. 14. As can be seen, the agreement is associated with (i) swaps and options for metal commodities and (ii) options for energy commodities. Based on these parameters, the agreement modeling system controller 1000 may determine an appropriate agreement type and populate a document with appropriate terms and parameters for these types of transactions.

In general, the covered product matrix may be associated with any number of product types, such as equity products, stock products, index products, fixed income products, bond products, bank loan products, whole loan products, interest rate products, credit derivative products, commodity products, metal products, energy products, agriculture products, and/or any other type of product. Similarly, the covered product matrix may be associated with any number of transaction instruments, such as swap instruments, option instruments, buy instruments, sell instruments, call instruments, put instruments, forward instruments, pre-paid forward instruments, spot instruments, repurchase agreement instruments, loan instruments, warrant instruments, a contract for differences instrument, and/or any other type of instrument.

Moreover, the covered products matrix may indicate when a particular financial instrument is approved (or disapproved) with respect to an agreement between a party and a counter-party. Also note that the covered products matrix may indicate if either of these items are "under investigation" (e.g., approval or disapproval is pending) or "not contemplated" (e.g., by the party or the counter-party). Similarly, the covered products matrix may indicate compliance authorization information, default information, party or counter-party information, legal information, and/or master agreement information.

The agreement document may be generated at 1204 by defining one or more agreement terms based on pre-stored default transaction terms (e.g., "best practices" transaction terms). The agreement term may also be automatically determined by defining the agreement term based on information receive from a user (e.g., via a client device 10) or a legacy agreement system.

According to another embodiment, the agreement term is also based on information received from a satellite system. For example, the agreement term may be based on input received from a business system 30, a legal system 40, a compliance system 50, a credit system 60, a treasury system 70, and/or an operations system 80.

The covered products matrix may set the scope of a particular agreement between a party and a counter-party. From a compliance system 50 perspective, an individual covered products matrix may exist for each "entity pair" (e.g., a party-counter-party pair) or even an "entity triplet" (e.g., a party-counter-party-investment advisor triplet). From a legal system 40 perspective, a covered products matrix may exist for each agreement, and there may be multiple covered product matrices for a single entity pair or triplet. In this case, the agreement modeling system controller 1000 may ensure that this does not result in over-lapping coverage.

According to one embodiment, there are multiple layers of information associated with each intersection in the covered products matrix. For example, there may be an "authorized scope" layer that captures approval of the compliance system 50 regarding which products a given counter-party is allowed to trade. According to one embodiment, when the compliance system 50 indicates an authorized scope, the agreement modeling system controller 1000 defaults certain products to "no" based on a pre-defined rule. For example, if a new authorized scope entry is created for a particular counter-party, the agreement modeling system controller 1000 may default all foreign exchange products to "no" since the compliance system 50 does not typically approve foreign exchange products with that particular counter-party. According to one embodiment, an operator may override these defaults determinations.

Based on authority documents and other relevant information, the compliance system 50 may mark appropriate products with a "yes," indicating that those products may be traded with the counter-party. The compliance system 50 may also have the ability to mark products with a "no" (indicating disapproval) or "in progress" indicating that the product is in the process of being considered. All other boxes may remain blank indicating that the product has not been (and is not being) considered.

With respect to the legal system 40, there may also be a "document scope" layer that captures a range of products that could possibly be covered by a master agreement (e.g., according to a court of law). According to one embodiment, when a new master agreement is created, the agreement modeling system controller 1000 uses a default document scope if the agreement type in question is always limited to a certain subset of products. A user may also over-ride these default values.

There may also be an "approved scope" layer that captures the products for which legal system 40 would like to use a given master agreement. For example, the legal system 40 may define for each master agreement a set of trades for which that master agreement should be used. This set of trades may be a subset of the document scope, and the document scope may therefore be defined before the approved scope. According to one embodiment, the approved scope is limited to a subset of the authorized scope and would typically fall within the document scope.

Referring again to FIG. 12, the agreement document may be automatically transmitted at 1206 to the counter-party via the counter party communication address. For example, the agreement document may be automatically transmitted to a counter-party facsimile machine after being viewed and approved by a user (e.g., after the terms of the agreement have been negotiated as described herein). According to another embodiment, the agreement document is instead published via a secure Web site so that it may be accessed by the counter-party. In this case, a URL address and/or a password may be transmitted to the user or to the counter-party.

Agreement Generation

Figure 15:
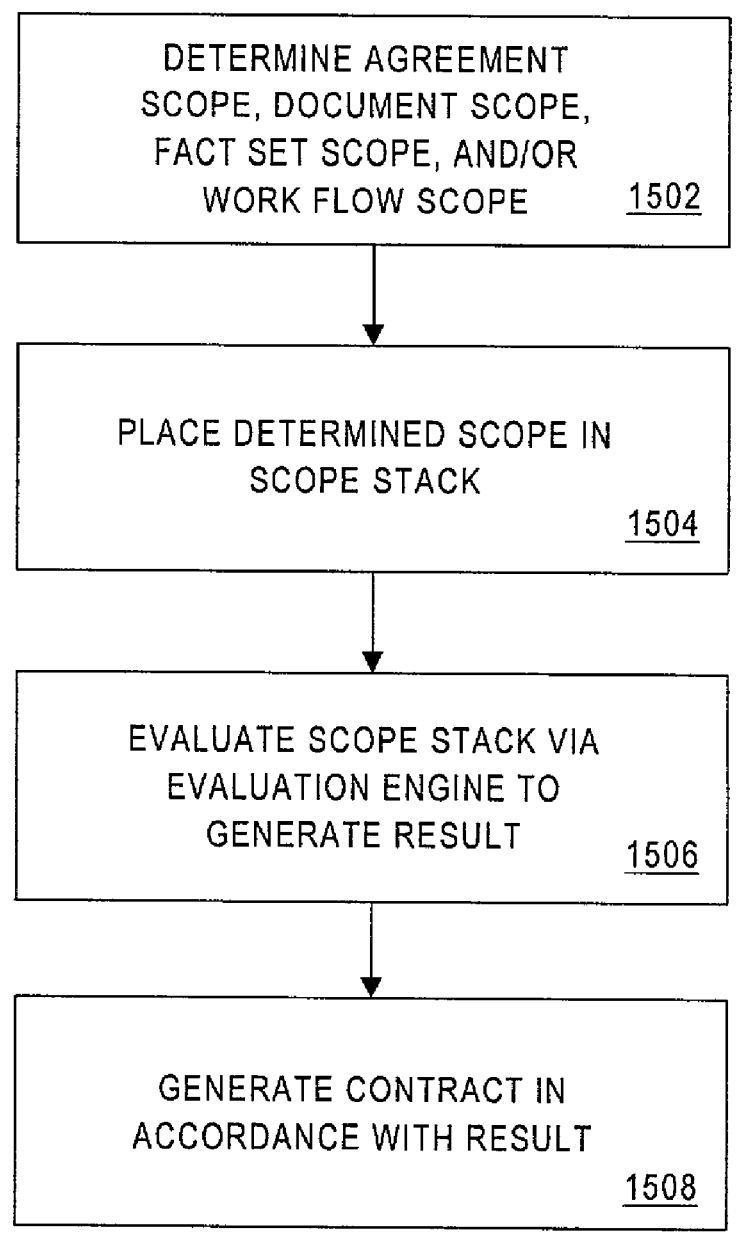
FIG. 15 is a flow chart of a method for generating a contract using a scope stack according some embodiments of the present invention.

FIG. 15 is a flow chart of a method for generating a contract using a scope stack according some embodiments of the present invention. At 1502, an agreement scope, a document scope, a fact set scope, and/or a work flow scope are determined. At 1504, the determined scope is placed in a scope stack. A set of agreement/document creation rules may be evaluated based on the information in the scope stack, and the scope stack may be evaluated via an evaluation engine to generate a result at 1506. At 1508, a contract is generated in accordance with this result. A detailed explanation of this process according to some embodiments of the present invention will now be provided with respect to FIGS. 16A through 21.

Figure 16A:
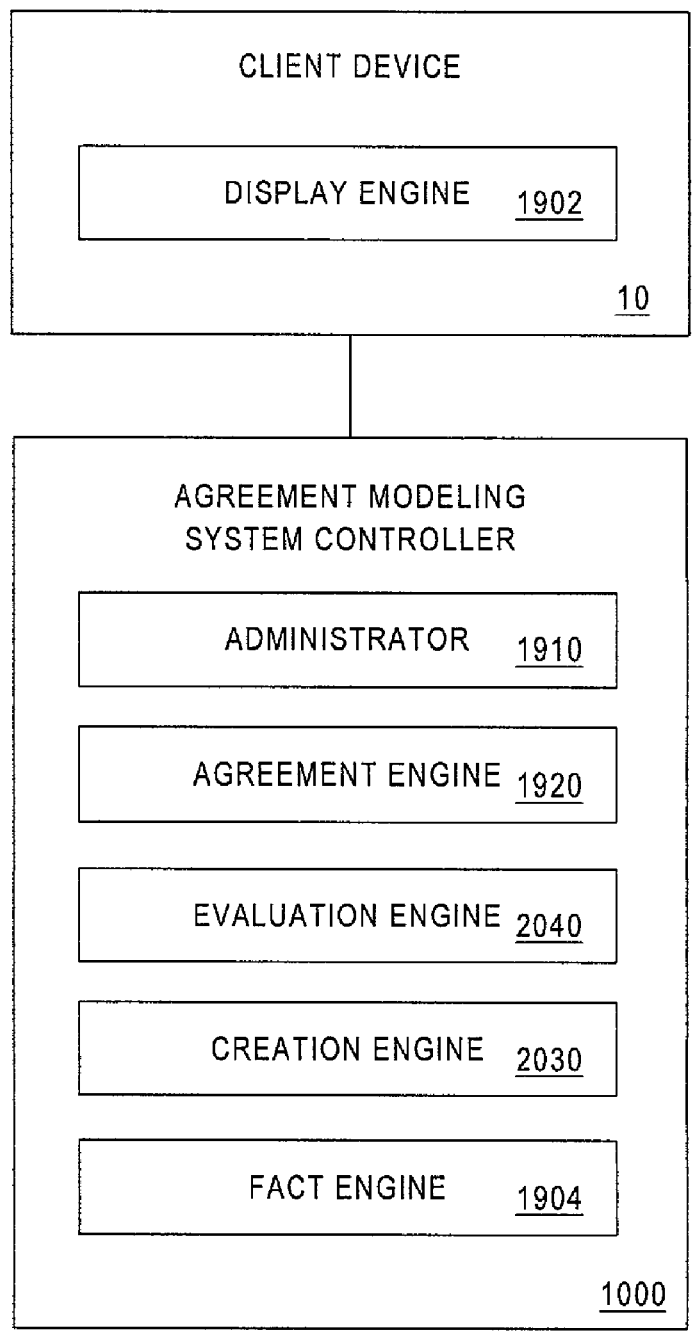
FIGS. 16A and 16B are block diagrams of agreement modeling system functions, applications, and interactions according to some embodiments of the present invention.
Figure 16B:
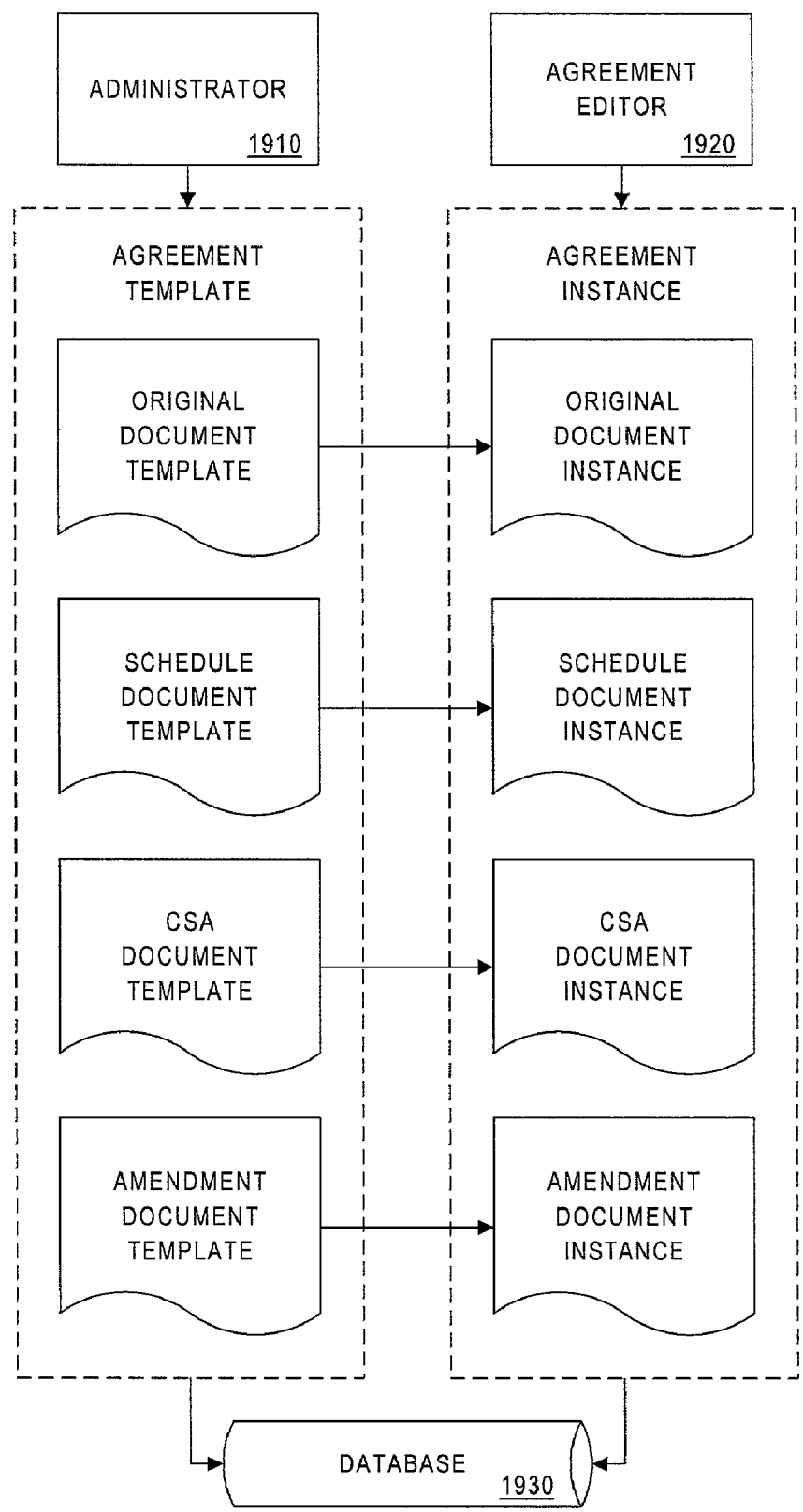

FIGS. 16A and 16B are block diagrams of agreement modeling system functions, applications, and interactions according to some embodiments of the present invention. In particular, FIG. 16A presents an engine-level overview of the client device 10 and the agreement modeling system controller 1000 according to one embodiment. The client device 10 includes a display engine 1920 that may be used to exchange information with a user (e.g., by receiving information from and displaying information to the user). The display engine 1920 may comprise, for example, a typical WINDOWS® style Multi-Document Interface (MDI) application. Such an application may simultaneously display one or more agreements. Some examples of user displays that may be processed by the display engine 1902 are described herein with respect to FIGS. 23 through 25.

The agreement modeling system controller 1000 includes an administrator 1910 and an agreement engine 1920 described in detail with respect to FIG. 16B. The agreement modeling system controller 1000 also includes an evaluation engine 2040 and a creation engine 2030 described in detail with respect to FIGS. 17 through 21. In addition, the agreement modeling system controller 1000 may include a fact engine 1904 to process facts and fact sets as required.

FIG. 16B illustrates the operation of the administrator 1910 and the agreement editor 1920. The administrator 1910 may be used to create an agreement template, including templates for various documents associated with that type of agreement. For example, the agreement template may include an original document template, a schedule document template, a CSA document template, and/or an amendment document template.

The agreement editor 1920 may be used to create an agreement instance based on the agreement template. The agreement instance may, for example, include instances of one or more document templates (e.g., an original document instance, a schedule document instance, a CSA document instance, and/or an amendment document instance).

Both the agreement template and the agreement instance may be stored in an agreement modeling system database 1930 for future use.

Figure 17:
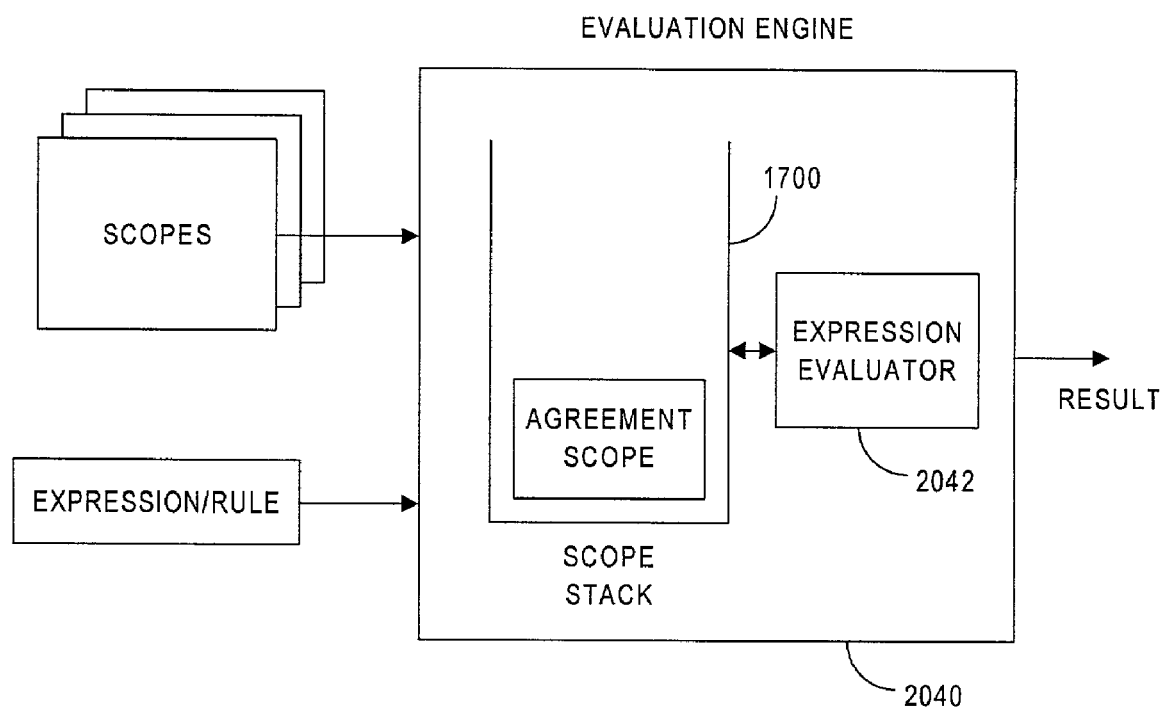
FIG. 17 is a block diagram of an evaluation engine according to some embodiments of the present invention.

FIG. 17 is a block diagram of the evaluation engine 2040 according to some embodiments of the present invention. The evaluation engine 2040 allows for the dynamic evaluation and performance of rules, expression, and actions at runtime. As used herein a "rule" may be a type of expression that returns a Boolean value (i.e., "true" or "false") to control the agreement modeling system 300. An "expression" may be a more generalized computation that returns an arbitrary string. An "action" may be a specialized expression that contains one or more functions that are evaluated by the evaluation engine 2040 to perform a specific task (e.g., to send an electronic mail message, perform a batch update, or add a log entry). Using these three types of computations, the evaluation engine 2040 may be employed on both the client and server sides to meet a broad range of requirements.

The evaluation engine 2040 is comprised of two major components: the scope stack 1700 and the expression evaluator 2042. The scope stack 1700 may contain the entire set of variables (e.g., facts) that are available to the expression evaluator 2042 at any point in time. During operation, the scope stack 1700 may change to reflect the current state of accessible facts available to the expression evaluator 2042. The expression evaluator 2042 is the actual engine that parses a supplied rule/expression, performs callbacks to the scope stack 1700 to resolve fact references, and computes the range of operations in the expression (expressed via operators and functions) to return a final result. A call to the evaluation engine 2040 returns a result that is a string, such as:
 "true" or "false" in the case of a rule;
 "success" or "failure" in the case of an action to indicate the result of the performed action; or
 an arbitrary string result in the case of an expression (depending on the specific context when the expression is evaluated).

According to one embodiment, the inputs to the evaluation engine 2040 are a set of scopes and one or more rules/expressions. Prior to use, the scope stack 1700 may be initialized by pushing one or more scopes onto the stack 1700. The scope stack 1700 will be searched in a top-down order when asked to resolve an instance of a fact (i.e., the last scope pushed onto the stack 1700 will be the first scope that is searched). If no instance is found by the time the bottom of the scope stack 1700 is reached, a special exception may be returned.

Once initialized, an instance of the evaluation engine 2040 may be called an unbounded number of times to evaluate rules and/or expressions (and to perform actions). According to one embodiment, there is no restriction on the types (or sequence) of the rules, expressions, and actions that are performed by an instance of the evaluation engine 2040. Typically, an instance of the evaluation engine 2040 will be created to perform a broad range of operations given the same initialized scope. Note that a single instance can have a different set of scopes pushed on to (or popped off of) the scope stack 1700 in between calls to the expression evaluator 2042.

According to one embodiment, four different types of scopes may be present in the scope stack 1700: an agreement scope, a document scope, a fact set scope, and a workflow scope.

An "agreement scope" may contain facts, defined by a set of wizard fact sets, that are used to create an agreement—including related fact sets (e.g., fact sets nested via "button" and "list" data types). This set of wizard fact sets is collectively called the "agreement wizard." According to one embodiment, an agreement wizard is not re-entrant. That is, once an agreement wizard's set of facts have been answered, they are static for the life of the agreement (and, as a result, the one-and-only agreement scope may always be active).

A "document scope" may contain a set of facts that are defined by a document's primary fact set, as identified as an attribute of the associated document type. According to one embodiment, a document has one, and only one, primary fact set. There may be only one active document scope at any point in time, which is defined by the current document instance's primary fact set.

A "fact set scope" may contain a set of facts that are defined by the current fact set. Note that there may be more than one fact set scope active (e.g., when a nested fact set has been invoked by pressing a button generated by a button data type or by invoking an instance of a multi-instance fact set associated with a list data type).

Finally, a "workflow scope" may contain a special set of facts that are defined by a fact set populated with relevant information associated with the current set of workflow operations being performed. This scope may be independent of other scopes and may be either the only scope on the scope stake 1700 or the top-most scope (i.e., the last scope placed on the stack).

The scope stack 1700 must contain at least one of these scopes before being used to evaluate a rule/expression. At a minimum, there may be either an agreement scope or a workflow scope on the scope stack.

For the agreement, document, and fact set scopes, there may be a required order to scopes on the scope stack 1700. For example, the agreement scope may always at the bottom of the scope stack 1700. If it exists, a one-and-only document scope may come next on the scope stack 1700 (i.e., immediately on top of the agreement scope). Finally, one or more fact set scopes can exist at the top of the scope stack 1700.

Figure 18:
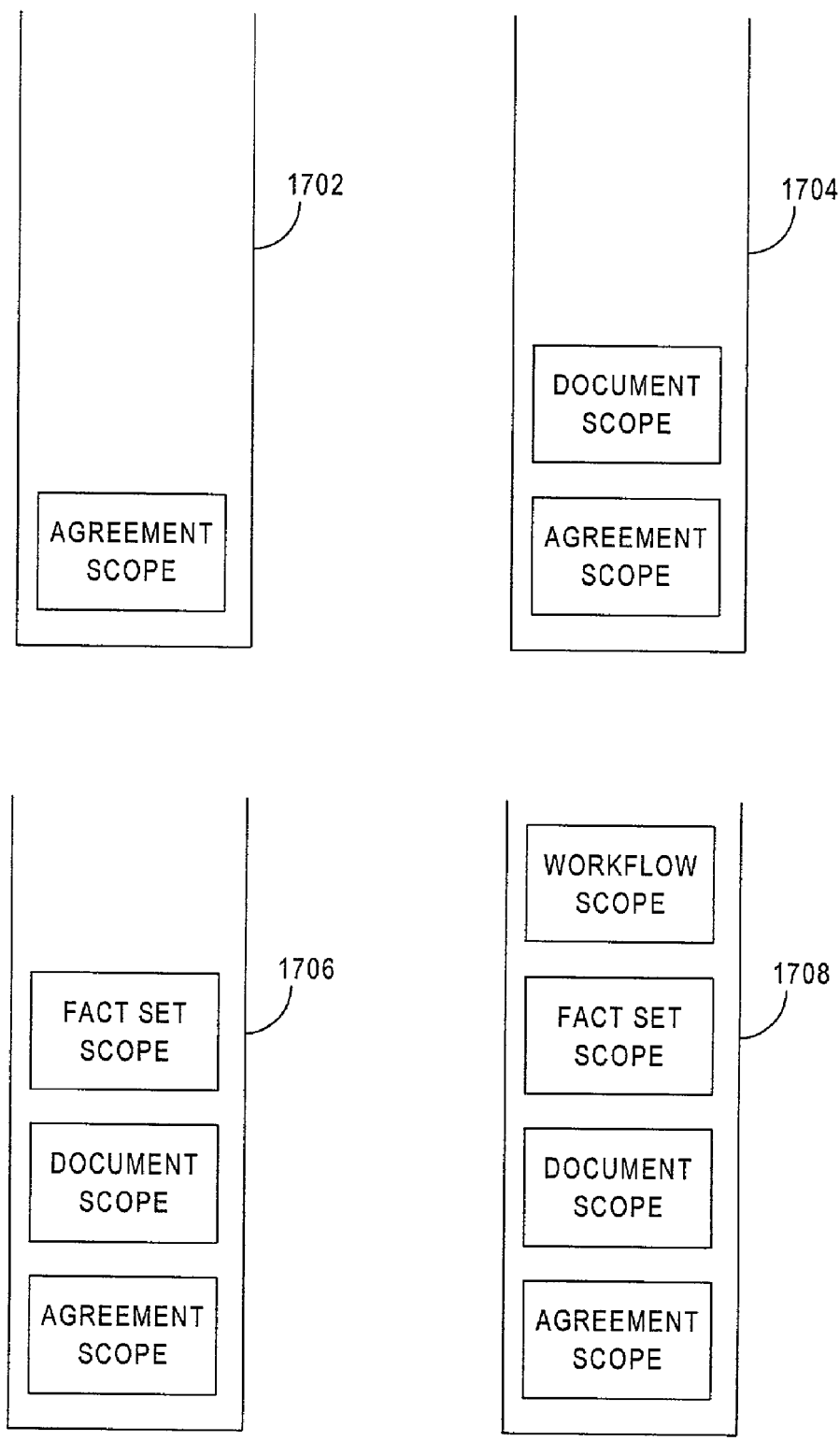
FIG. 18 illustrates a number of scope stacks according to an embodiment of the present invention.

FIG. 18 illustrates a number of scope stacks 1702, 1704, 1706, 1708 according to an embodiment of the present invention (e.g., depicting a number of scope hierarchies in the scope stack 1700 for an instance of the evaluation engine 2040 at a single point in time).

The first example 1702 illustrates the scope stack 1700 containing the minimum agreement scope. When a document is active, the document scope constructed from the document's primary fact set is then pushed onto the stack (e.g., as in the second example 1704). When a fact set is active within the active document, the appropriate fact set scope is pushed onto the stack (e.g., as in the third example 1706). The fourth example 1708 illustrates the possible existence of a workflow scope on top of all of the other scopes—the deepest nesting that can occur on the scope stack 1700 according to this embodiment.

As used herein, a "root node fact set" is a fact set that does not have any other fact set as a parent—it is only owned by the document in which it is contained. A "child fact set" is any fact set that is a dependent on a root node fact set (e.g., a fact set associated with a button or a list).

A "fact namespace" exists within each fact scope. A fact that belongs to a root node fact set may be immediately accessible in a scope's namespace. On the other hand, a fact in a child fact set (and a fact in a multi-instance fact set) may not be immediately accessible. Instead, these facts may be accessed via fact accessor functions available within the expression evaluator 2042.

In the scope stack 1700, each instance of a fact set has a corresponding "fact set context." A fact set context contains all of the fact names and fact values defined by an instance of a fact set, plus a linkage to all child (dependent) fact set contexts. Within a scope on the scope stack 1700, root node fact set contexts are also stacked within the scope. As with scopes, the order on the stacked fact set contexts determines the search order when resolving references to fact names within a specific scope 1700.

Figure 19:
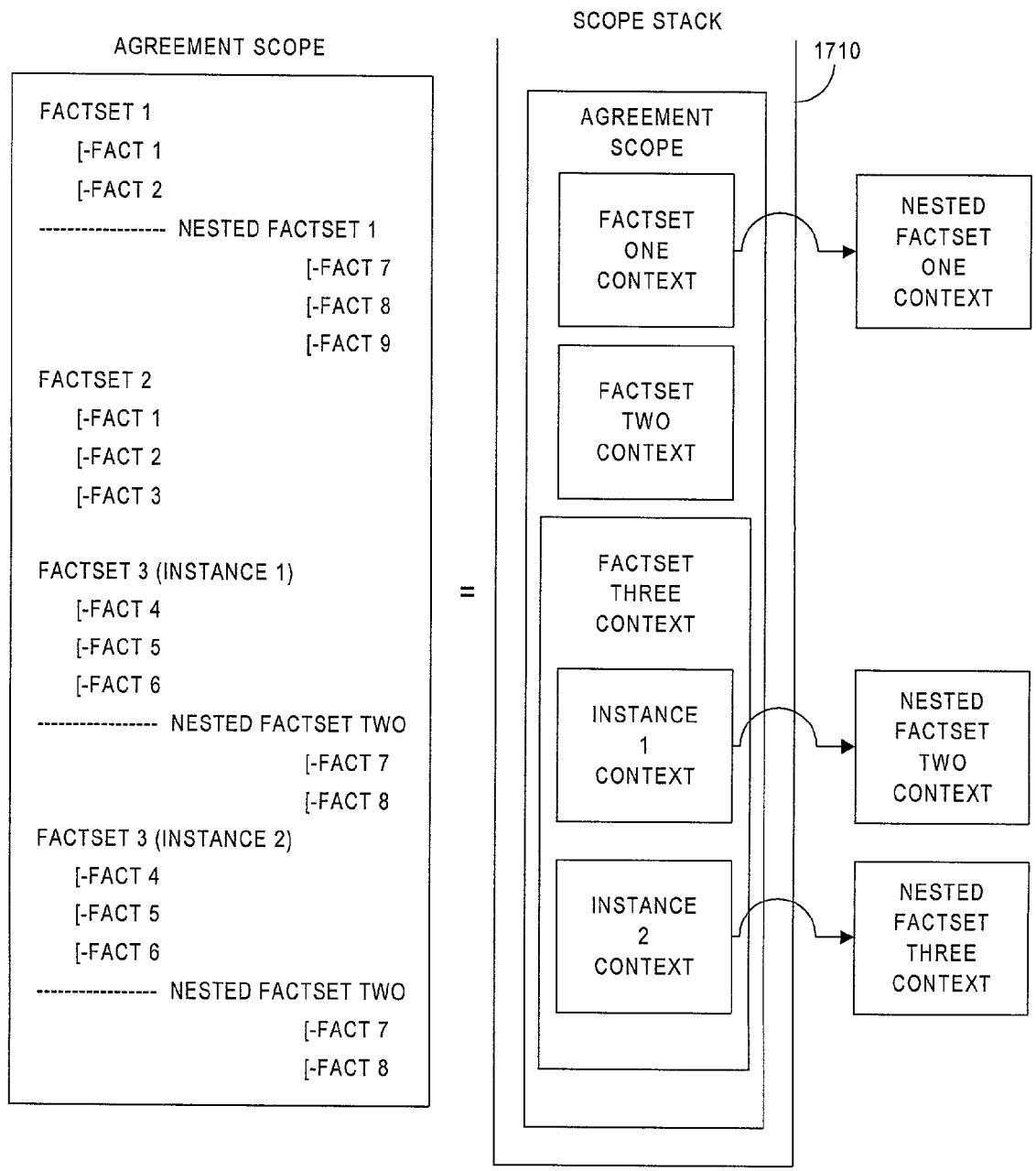
FIG. 19 illustrates fact namespaces, fact set contexts, and scopes according to some embodiments of the present invention.

FIG. 19 illustrates fact namespaces, fact set contexts, and scopes according to some embodiments of the present invention. In particular, the stacking of fact set contexts and linkage to child fact set contexts are illustrated. For an agreement scope, there is one root node fact set for each fact set defined as a wizard page (e.g., all of the fact sets directly accessible via the wizard's next and back buttons). In terms of the scope stack 1710, the order of the agreement scope's root node fact set contexts is the reverse of the order that the wizard pages occur in the wizard. That is, the first wizard fact set context is on the bottom of the scope stack 1710 (within the agreement scope) and the last wizard fact set context is at the top of the scope stack 1710 (within the agreement scope). So, based upon the scope stack 1710 illustrated in FIG. 19, the FactSetThree is the first wizard fact set page and FactSetOne is the last wizard fact set page.

For the case of multi-instance fact set instances, there exists a separate fact set context for each instance (see FactSetThree in FIG. 19). However, only the facts in the first instance of a multi-instance root node fact set are directly accessible without the use of fact accessor functions.

In general, the accessibility to facts may be described in a vertical or horizontal fashion as depicted in FIG. 19. With the exception of multi-instance fact set instances, all vertically stacked fact contexts within all of the vertically stacked fact scopes defines all of the facts that are directly accessible during a search. The search occurs from the top-down (i.e., starting with the top-most fact set context in the top-most fact scope and ending with the bottom-most fact set context within the bottom-most fact scope). Again, access to any facts that exist within non-root node fact sets (e.g., child fact sets) may be accomplished via fact accessor functions.

According to one embodiment, facts may be referenced via two names in a given namespace. One is the "unqualified" fact name and the second is the "fully qualified" fact name. The unqualified fact name is the case-insensitive fact name itself. The fully qualified fact name is the FactSetName:FactName concatenated together with a colon separator. Note that other separators may also be used (e.g., a "." or a "$").

If a fact is unresolved on the scope stack 1710 during the course of evaluation, the overall return value to the currently evaluated rule, expression, or action may be "false," an empty string, or "failure," respectively.

Fact accessor functions allow systematic access to child fact sets and instances of multi-instance fact sets, in addition to providing a range of general access functions to any fact and fact set instance. These functions may be available for use in any rule or expression. The following are some examples of fact accessor functions:

Boolean FactExists(<Fact>)—returns "true" if an instance of the named <Fact> exists anywhere on the scope stack 1700 (including nested children and all multi-instance fact sets).

Boolean FactExists(<Fact>, <Value>)—returns "true" if an instance of the named <Fact> exists anywhere on the scope stack 1700 (including nested children and all multi-instance fact sets) with the assigned <Value>. The <Value> may be an arbitrary expression itself that results in a string.

Boolean FactExists(<ChildFact>, <ChildValue>, <ParentFact>, <ParentValue>)—returns "true" if an instance of the named <ChildFact> exists anywhere on the scope stack 1700 (including nested children and all multi-instance fact sets) with the assigned <ChildValue> when its <ParentFact> has the assigned <ParentValue>. The values for both child and parent may be arbitrary expressions that result in a string.

Boolean FactSetExists(<Fact set>)—returns "true" if an instance of the named <Fact set> exists anywhere on the scope stack 1700 (including nested children and all multi-instance fact sets).

As previously mentioned, the agreement modeling system may be rules-driven, using a range of rules and expressions to control the system's behavior, such as:

applies rules;
fact default value expressions;
fact default attribute expressions;
enabled rules;
multi-instance fact set name expressions;
multi-instance fact set primary key expressions;
multi-instance document name expressions;
security access rules;
workflow rules; and
workflow actions.

Each of these rules, expressions, and actions will now be described in more detail.

The evaluation of "applies" rules may occur at the server, and the agreement and/or document scopes may be on scope stack 1700 when this evaluation occurs. According to one embodiment, a number of database tables associated with agreement modeling define a potential set of components (e.g., an agreement type, a document type, a fact set, or a fact) that apply in a given context. The inclusion of facts into fact sets, fact sets into documents, documents into agreements, and which agreement type applies given a specific context may be controlled via applies rules. Applies rules are expressions that are constructed and evaluated based upon the facts available in the system.

According to one embodiment, zero or more applies rules can be associated with any individual component (with the default being zero). The lack of any applies rules being associated with a component implies the automatic inclusion of the component in any context. If one or more applies rules exist, then any one of the rules must be "true" (e.g., an OR condition against each of the rules) in order to include the component in a specific context.

For a fact component, a default value expression and default attribute expression may be associated with each specific applies rule. If an applies rule is "true," then the other two expressions (if they exist) are evaluated and the results applied to the fact.

The evaluation of "fact default value" and "fact default attribute" expressions may occur at the server, and the agreement and/or document scopes may be on scope stack 1700 when this evaluation occurs. The default value and default attribute expressions may be expressions that compute default value(s) to be assigned to a fact and the default attribute to be set for an instance of a fact.

The evaluation of "enabled" rules may occur at the client and/or a server, and the agreement, document, and/or fact set scopes may be on scope stack 1700 when this evaluation occurs. For both fact set and fact components, there may exist enabled rules that dynamically control the enabling/disabling of the associated component within the client-side agreement editor application. The lack of an enabled rule associated with either a fact set or fact component implies automatic access (i.e., the "enabled" state) to that component within a user's screen. If an enabled rule exists associated with a fact set or fact, then the rule must evaluate to "true" to enable access to the component.

The evaluation of the "multi-instance fact set name" and "multi-instance fact set primary key" expressions may occur at the client, and agreement, document, and/or fact set scopes may be on the scope stack 1700 when this evaluation occurs. For multi-instance fact sets, the fact set is required to provide an appropriate multi-instance name expression by which its name is derived for display in the instance list within the editor client. Typically, this name is assembled from the values of facts within the fact set via a concatenation of fact set fact values as dictated by the multi-instance name expression.

The multi-instance fact set name expression is special in that it may contain a mixture of list box column-heading formatting information in addition to the individual expressions required to compute each column's contents for that instance. Optionally, each instance of a multi-instance fact set can require that its name is unique, thereby enforcing the notion of a primary key as described by the multi-instance fact set name expression. The unique attribute applied to a multi-instance fact set is enforced by the editor upon completion of the dialog associated with the instance. The editor may compare current instance names with the currently computed instance name to prevent duplicates.

The evaluation of the "multi-instance document name" expressions may occur at the client, and the agreement and/or document scopes may be on scope stack 1700 when this evaluation occurs. For multi-instance documents, a document attribute provides an appropriate multi-instance name expression by which its document name is derived for display in the multi-document instance list within a multi-document tab.

The evaluation of the "security access" rules may occur at the server, and the agreement scope may be on scope stack 1700 when this evaluation occurs. Because agreements are dynamically constructed based upon a rule set that is evaluated at runtime, a security model that dictates access to agreements/documents must also be rules based. For example, agreements may be formed based upon answers to questions that appear via a wizard fact set. Even though initial access to all wizard fact sets may be enforced within the security model, the answers to the questions may indicate which agreements can be potentially formed by the rules associated with the agreement types. Without knowing which answers the user will select (or without even knowing the questions that will be asked), a rule set may be put into place ahead of time that ensures that a user's set of potential agreements does not change.

According to one embodiment, a security table contains zero or more entries per security group that specifies access rights to the set of agreements and documents that a user is allowed to access (i.e., given that the user is a member of the group). Each table entry may partition access into specific create, delete, and implied update rights. An optional access expression may also be associated with each table entry. According to one embodiment, the access rights are automatically applied when an access expression does not exist. If an access expression exists associated with the table entry, then the expression must evaluate to "true" for the set of access rights to apply.

The evaluation of the "workflow" rules may regulate the performance of workflow actions throughout the system. The evaluation of the "workflow" actions may occur at the server, and the agreement scope may be on scope stack 1700 when this evaluation occurs. In addition, a workflow action expression may be specified associated with every applies rule in the system to enable execution of the workflow action (expressed as a function in the evaluator) provided the applies rule is "true."

According to one embodiment, the agreement modeling system also enables extension of a set of workflow actions via a Java method that expands the base set of functions available in the evaluation engine 2040. In addition, a generalized mechanism to define a workflow wizard enabling population of values by a user may be provided.

Figure 20:
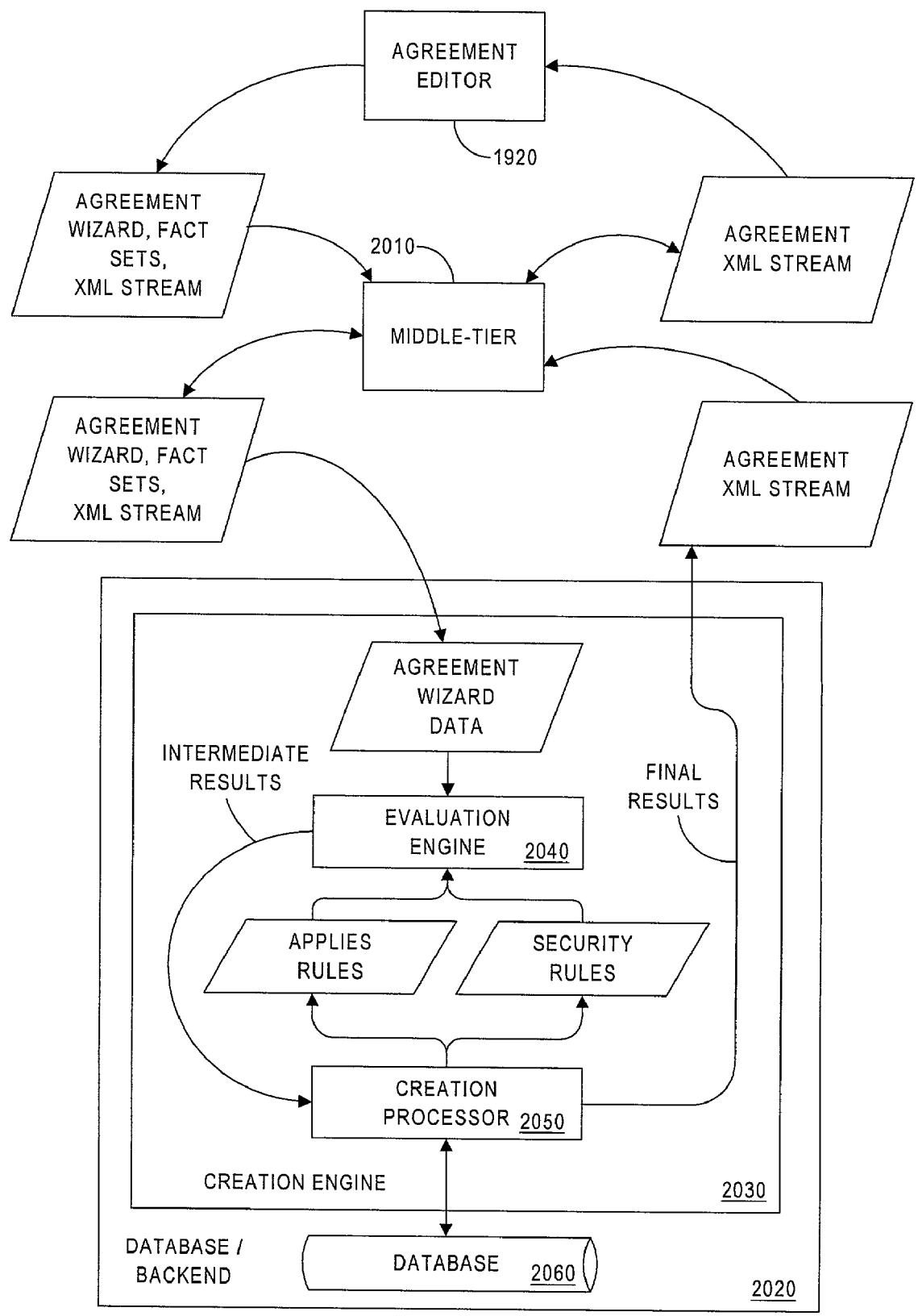
FIG. 20 is a block diagram of agreement creation interactions according to some embodiments of the present invention.

FIG. 20 is a block diagram of agreement creation interactions according to some embodiments of the present invention. In particular, the creation engine 2030 may manufacture new agreements and documents. The creation engine 2030 may exist in the database/backend 2020 and may comprise a creation processor 2050 and an instance of the evaluation engine 2040 (e.g., that extends from the evaluation engine 2040 object in the Java/object sense).

The creation engine 2030 may service two types of create operations: a create agreement operation and a create document operation. A successful create agreement operation results in a new agreement including one or more associated required documents. A successful create document(s) operation results in the creation of one (or more) new documents associated with an existing agreement.

An instance of the creation engine 2030 is manufactured to service each create operation (note that the create functionality may be exposed via Java Stored Procedures). The create agreement operation may be invoked from the agreement editor 1920 upon a completion of an agreement wizard as follows. The agreement wizard may be selected via a "file— new" menu item, followed by selection of sub-menu items that allow selection of a specific agreement wizard. The content of each agreement wizard may be defined by one or more agreement wizard fact sets. The agreement wizard is completed by activating a "finish" button on one of the wizard pages. When the "finish" button is activated, all of the combined agreement wizard fact sets are communicated to the database backed 2020, in the form of an XML document describing the fact set content, via a middle-tier 2010. The middle-tier 2010 simply passes the stream through to the database/backend 2020.

Upon the invocation of a stored procedure, an instance of the creation engine 2030 is instantiated. Within the instance of the creation engine 2030, an instance of the evaluation engine 2040 is created and initialized with an agreement scope that contains all of the facts defined in the wizard fact sets passed from the agreement editor 1920.

Once the creation engine 2030 and its embedded evaluation engine 2040 are initialized, the creation processor 2050 determines the appropriate agreement to be created (via "applies rules"). If an appropriate agreement is found, it is determined if the user has the appropriate rights to create all required documents associated with the agreement (via "security rules"). If the user has appropriate rights, then the agreement is created by systematically creating the required documents associated with the agreement, conditionally populating each document's content with the fact sets and facts that are included through the applies rules analysis. In addition, default values and attributes may be assigned to facts populated into documents.

The creation processor 2050 may use a series of stored procedure calls that operate directly on the agreement, document, and fact set or fact instance tables populating instance data into the tables as the intermediate result of rules and expression evaluations. In general, a set of well-defined stored procedures may accommodate the entire agreement creation process.

After the agreement and all of its associated required documents have been created, updates to security access tables and views may be computed.

The immediate return value for the create agreement operation from the database/backend 2020 to the middle-tier 2010 may simply comprise signal of success or failure. If the creation of the agreement failed, then the middle-tier 2010 returns an appropriate Java exception to the agreement editor 1920.

Upon successful creation of an agreement, the middle-tier 2010 (prior to returning information to the agreement editor 1920) may orchestrate call(s) back to the database/backend 2020 to make it appear as if the agreement editor 1920 had called an "open agreement" operation. That is, an entire XML stream representing the opening of the newly created agreement may be returned.

Figure 21:
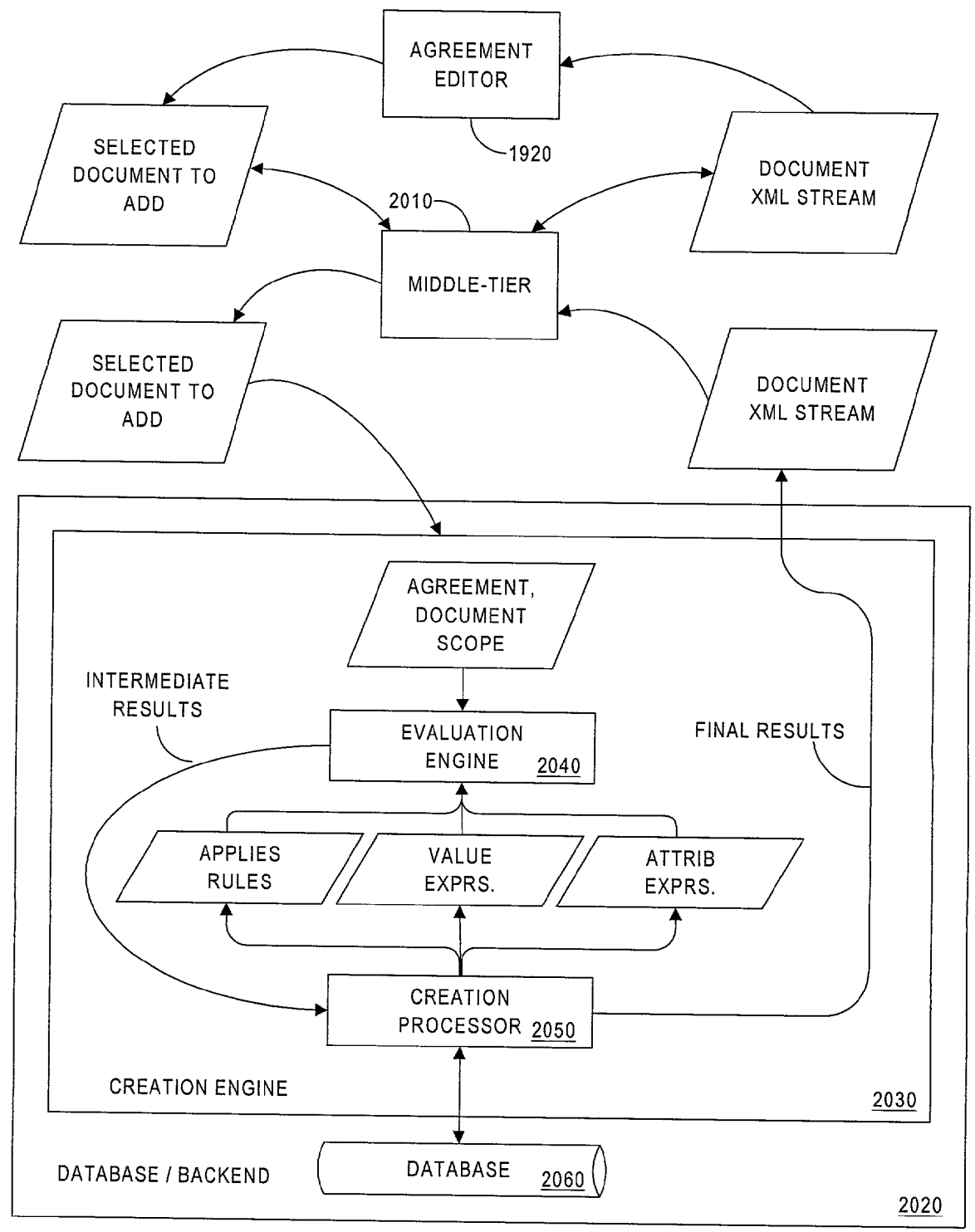
FIG. 21 is a block diagram of document creation interactions according to some embodiments of the present invention.

FIG. 21 is a block diagram of document creation interactions according to some embodiments of the present invention. The create documents operation may be invoked from the agreement editor 1920 when an "add" button is activated via a multi-document tab and one of the listed document types are selected. Such a multi-document tab approach enables the management of more than one document (and document type) via a single tab. A multi-document list box may display all instances of existing documents that are associated with that tab (e.g., documents may be associated with a tab based on a document type's document group membership).

When the "add" button is activated, the agreement editor 1920 may first call a method that returns an array of (partially loaded) objects that are used to populate an "add document" selection dialog associated with the "add" button. A corresponding stored procedure may form the list of document types based on a specific user and/or agreement.

Upon the selection of a document type from the "add document" list, the agreement editor 1920 sends the selected document type information to the database backed 2020 via a middle-tier 2010 API call.

An instance of the creation engine 2030 is then instantiated by the database/backend 2020. Within the instance of the creation engine 2030, an instance of the evaluation engine 2040 is created and initialized with the agreement scope that is applicable for the active agreement. According to one embodiment, the agreement scope is passed as an XML stream by the agreement editor 1920 which has the scope loaded for the active agreement. According to another embodiment, the scope is instead loaded from a database 2060.

Once the creation engine 2030 and the embedded evaluation engine 2040 are initialized, the creation processor 2050 conditionally populates the document's content with the fact sets and facts that are included through an "applies rules" analysis. In addition, default values and attributes are assigned to each fact based upon "value and attribute expressions."

Depending upon the context of the create document algorithm invocation, the instance of the creation engine 2030 may be associated with a create agreement operation or a create document operation. In either case, the appropriate agreement scope may be initialized on the associated evaluation engine 2040.

Note that a series of stored procedure calls by the creation processor 2050 may operate directly on the document and fact set—fact instance tables populating instance data into the tables as the result of the rules and expressions evaluations. In general, a set of well-defined stored procedures may accommodate the entire agreement, document, fact set, and/or fact creation process. At the end of the create document algorithm, security tables and views may be calculated.

The availability of the document scope enables applies rules, value expressions, and attribute expressions to be written that are generally more localized to a document's context. With the document scope included, rules and expressions can be written that do not need to rely solely on agreement level attributes to drive the creation process.

The intermediate return value from the create document operation from the database/backend 2020 to the middle-tier 2010 may simply be a signal of success or failure. If the creation of the document failed, then the middle-tier 2010 returns an appropriate Java exception to the agreement editor 1920.

Upon successful creation of a document, the middle-tier 2010 (prior to returning information to the agreement editor 1920) may orchestrates call(s) back to the database/backend 2020 to make it appear as if the agreement editor 1920 had called an update document operation. That is, an entire XML stream representing the newly created document may be returned.

Agreement Modeling System Client Displays

Figure 22:
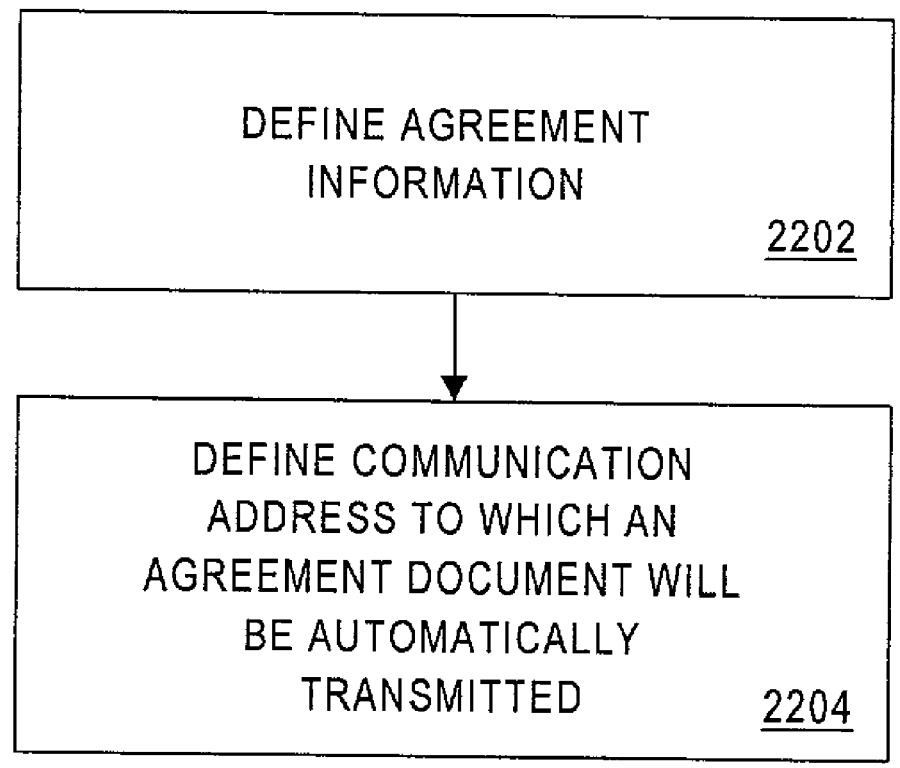
FIG. 22 is a flow chart of a method performed by a user according some embodiments of the present invention.

FIG. 22 is a flow chart of a method performed by a user according some embodiments of the present invention. At 2202, the user arranges for agreement information to be transmitted from the client device 10 to the agreement modeling system controller 1000. For example, the user may select a number of financial instruments and/or financial products via the client device 10.

At 2204, the user defines a communication address to which an agreement document will be transmitted (e.g., a communication address associated with a counter-party device 15). The communication address may be, for example, entered by the user or selected from a list of potential communication addresses.

The communication address may be a counter-party communication address (e.g., an electronic mail address or postal address). The communication address may also be associated with a different party, a particular device, and/or the user (e.g., an electronic mail address associated with a legal department).

According to one embodiment, the user defines a number of different communication addresses to which an agreement document will be transmitted. According to another embodiment, the communication address is instead defined by the agreement modeling system controller 1000 and transmitted to the user (or to the counter-party). For example, the agreement modeling system controller 1000 may generate and transmit a URL address and password that can be used to access an agreement document.

Figure 23:
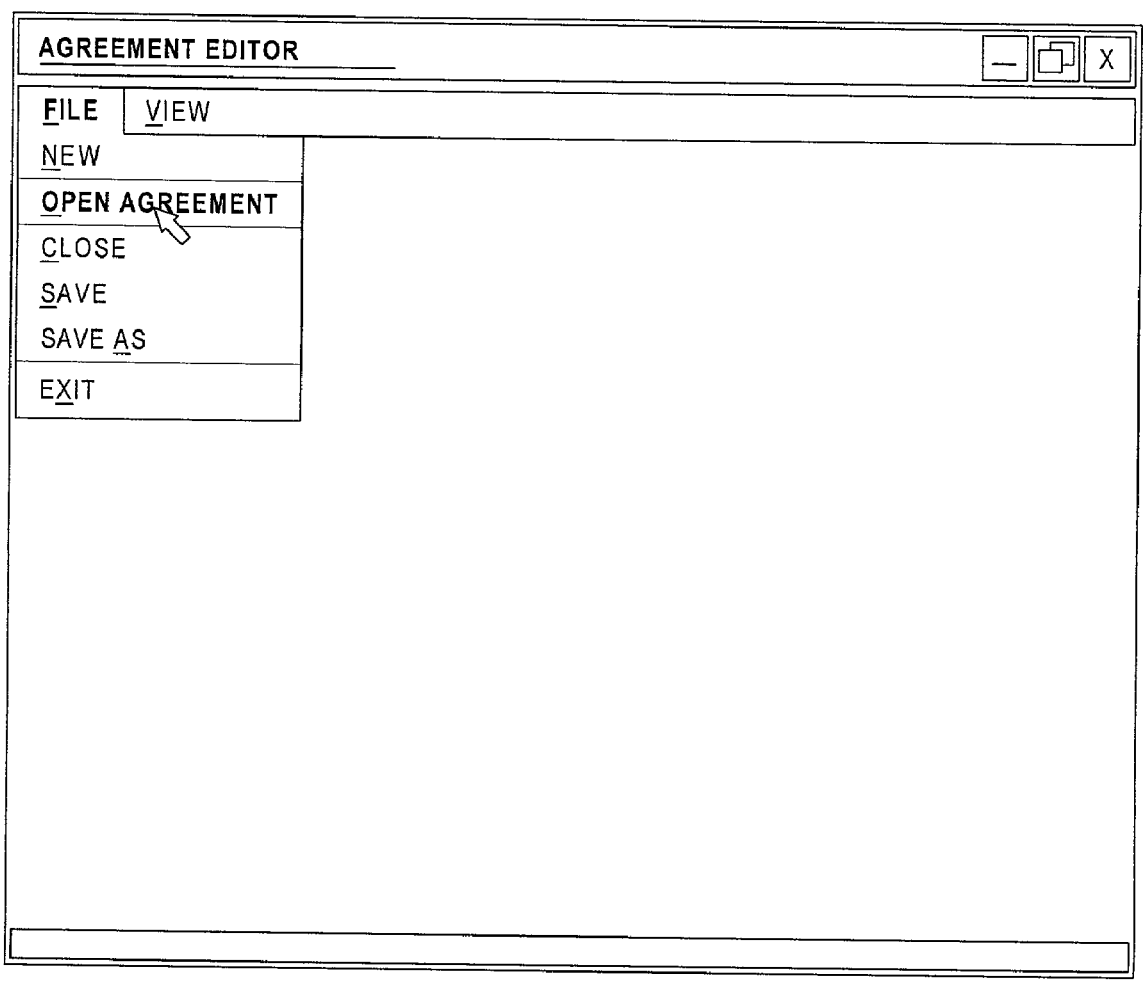
Figure 25:
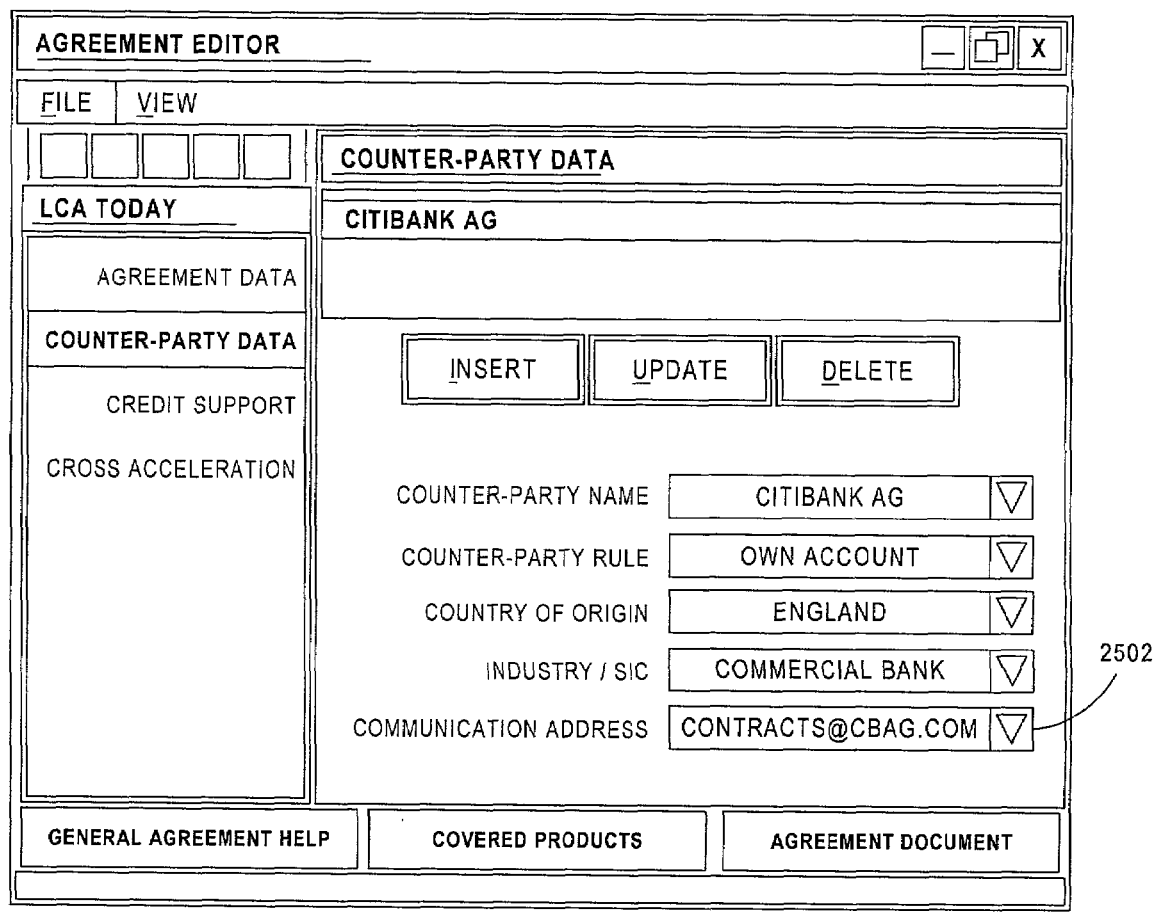

FIGS. 23 through 25 illustrate client displays associated with an agreement according to an embodiment of the present invention. Note that the system may be document-centric in the display of agreement information, and that a new agreement may be created via a special wizard "fact set" that asks questions and receives answers (fact values) that are used by the fact engine's rules-based wizard to determine the agreement type, documents, fact sets, and facts that are populated in the agreement.

In particular, FIG. 23 illustrates a display 2300 when no agreement is loaded into the application. A user selects an existing agreement from a search dialog that is associated with the "file . . . open agreement" menu item.

FIG. 24 illustrates a display 2400 after an agreement has been loaded. Each agreement instance in the MDI display frame contains a set of display tabs that are dynamically generated according to a set of document groups that are defined for the agreement. Each document group has one or more documents that are members of the group and whose contents will be displayed on the relative document group tab.

As can be seen, FIG. 24 illustrates the layout of a general "agreement data" single-document group tab. Note that a consistent display space may be organized around the current document and active fact set. For example, a tab associated with a single-document display may divide the display 2400 into a left and right pane.

The current document's name ("LCA Today") is displayed at the top of the left-pane. The left-pane list box contains the set of fact sets that are defined for the current document (e.g., "agreement data," "counter-party data," "credit support," and "cross acceleration"). The right-pane contains the contents for the actively selected fact set within the current document. The name of the active fact set (e.g., "agreement data") may be displayed in the top of the right-pane.

FIG. 25 illustrates a display 2500 when an agreement has been loaded, and the display 2500 is associated with a multi-instance fact set display (i.e., "counter-party data"). In this case, the right-pane is divided into two areas. The top area includes a list box of instances of the active fact set. The display entry in the list box is formed by an expression associated with the fact set. The bottom portion of the right-pane display area indicates the facts that comprise the fact set which may be displayed in linear order (as with the single-instance display space). Note that one of the facts displayed is a counter-party communication address 2502 (i.e., "contracts@cbag.com"). The user may enter (or select) a counter-party communication address 2502 to which a generated agreement document will be transmitted.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Many of the embodiments described herein include an agreement modeling system controller 1000 that facilitates generation and/or negotiation of an agreement document. According to other embodiments, however, some or all of these functions are instead performed by other devices. For example, multiple devices may communicate with each other to perform the functions described herein without the use of a "controller" (e.g., a peer-to-peer model may be used). Moreover, many of the devices illustrated in FIG. 3 (including some or all of the satellite systems) may be incorporated in a single device.

In addition, many of the embodiments described herein are directed to financial transaction agreements. However, the present invention is applicable to may other types of agreements as well (e.g., contracts with a governmental authority).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A processor-implemented method for facilitating generation of an agreement document associated with a financial transaction agreement between a party and a counter-party, comprising:
   receiving in a data storage element and processing in a processor the agreement information from a user associated with the party the agreement information including:
      (i) a counter-party communication address and
      (ii) information about a financial product associated with the financial transaction agreement;
   determining an agreement scope, a document scope, and a fact set scope;
   placing the determined agreement scope, document scope, and fact set scope in a scope stack;
   evaluating the scope stack via an evaluation engine to produce a result in accordance with a rule;
   generating the agreement document in accordance with the information about the financial product, a covered products matrix, and the result; and
   automatically transmitting the agreement document to the counter-party via the counterparty communication address.

2. The processor-implemented method of claim 1, wherein the counter-party communication address comprises at least one of: (i) an electronic mail address, (ii) an Internet address, (iii) a uniform resource locator, and (iv) a telephone number.

3. The processor-implemented method of claim 1, further comprising:
   automatically transmitting the agreement document via a communication address associated with the party.

4. The processor-implemented method of claim 1, wherein the party is associated with a first party entity and a second party entity, and further comprising:

transmitting the agreement document via a first communication address associated with the first party entity;
receiving information from the first party entity; and
transmitting the agreement document via a second communication address associated with the second party entity.

5. The processor-implemented method of claim 1, wherein the agreement document comprises at least one of:
(1) a final agreement document, and (ii) an amendment to an existing agreement document.

6. The processor-implemented method of claim 1, wherein the agreement document comprises a preliminary agreement document.

7. The processor-implemented method of claim 6, wherein said transmitting comprises automatically transmitting the preliminary agreement document via the counter-party communication address associated with the counter-party, and further comprising:
receiving a revised preliminary agreement document from the counter-party.

8. The processor-implemented method of claim 7, further comprising:
processing and reconciling the revised preliminary agreement document and the preliminary agreement document; and
generating a final agreement document in accordance with said reconciliation.

9. The processor-implemented method of claim 1, where said generating comprises automatically generating a plurality of agreement documents in accordance with the information about the financial product, the covered products matrix, and the result.

10. The processor-implemented method of claim 1, wherein the agreement information comprises at least one of: (i) an agreement type, (ii) an agreement term, and (iii) an agreement fact.

11. The processor-implemented method of claim 1, wherein the generated agreement document comprises a transaction agreement associated with at least one of (i) a set of rights between the party and the counter-party, (ii) a legal contract, (iii) a financial instrument, and (iv) a monetary amount.

12. The processor-implemented method of claim 1, wherein the financial product comprises at least one of (i) an equity product, (ii) a stock product, (iii) an index product, (iv) a fixed income product, (v) a bond product, (vi) a bank loan product, (vii) a whole loan product, (viii) an interest rate product, (ix) a credit derivative product, (x) a commodity product, (xi) a metal product, (xii) a energy product, and (xiii) an agriculture product.

13. The processor-implemented method of claim 1, wherein the financial transaction agreement is associated with at least one of (i) a swap instrument, (ii) an option instrument, (iii) a buy instrument, (iv) a sell instrument, (v) a call instrument, (vi) a put instrument, (vii) a forward instrument, (viii) a pre-paid forward instrument, (ix) a spot instrument, (x) a repurchase agreement instrument, (xi) a loan instrument, (xii) a warrant instrument, and (xiii) a contract for differences instrument.

14. The processor-implemented method of claim 1, wherein said generating is performed via at least one of: (i) covered product matrix information retrieved from a database, (ii) a pre-stored default transaction term, (iii) information received from a user of an agreement modeling system, (iv) information received from a satellite system, and (v) information received from a legacy agreement system.

15. An apparatus for facilitating processing and generation of an agreement document associated with a financial transaction agreement between a party and a counter-party, comprising:
a processor; and
a storage device in communication with said processor and storing instructions adapted to be executed by said processor to:
receive in a data storage element and process in a processor agreement information from a user associated with the party, the agreement information including:
(i) a counter-party communication address and
(ii) information about a financial product associated with the financial transaction agreement, determine an agreement scope, a document scope, and a fact set scope,
place the determined agreement scope, document scope, and fact set scope in a scope stack,
evaluate the scope stack via an evaluation engine to produce a result in accordance with a rule,
generate the agreement document in accordance with the information about the financial product, a covered products matrix, and the result, and
automatically transmit the agreement document to the counter-party via the counter-party communication address.

16. The apparatus of claim 15, wherein said storage device further stores an agreement information database.

17. The apparatus of claim 15, further comprising:
a communication device coupled to said processor and adapted to communicate with at least one of: (i) a client device, (ii) an agreement modeling system controller, (iii) a satellite system, and (iv) a counter-party device.

18. A processor-readable medium storing instructions adapted to be executed by a processor to perform a method of facilitating generation of an agreement document associated with a financial transaction agreement between a party and a counter-party, said method comprising:
receiving in a data storage element and processing in a processor agreement information from a user associated with the party, the agreement information including:
(i) a counter-party communication address and
(ii) information about a financial product associated with the financial transaction agreement;
determining an agreement scope, a document scope, and a fact set scope;
placing the determined agreement scope, document scope, and fact set scope in a scope stack;
evaluating the scope stack via an evaluation engine to produce a result in accordance with a rule;
generating the agreement document in accordance with the information about the financial product, a covered products matrix, and the result; and
automatically transmitting the agreement document to the counter-party via the counterparty communication address.

19. A processor-implemented method for facilitating generation of an agreement document associated with a financial transaction agreement between a party and a counter-party, comprising:
receiving in a data storage element and processing in a processor the agreement information from a user associated with the party the agreement information including:
a counter-party communication address and
information about a financial product associated with the financial transaction agreement;

determining an agreement scope, a document scope, and a fact set scope; placing the determined agreement scope, document scope, and fact set scope in a scope stack;

evaluating the scope stack via an evaluation engine to produce a result in accordance with a rule;

generating the agreement document in accordance with the information about the financial product, a covered products matrix, and the result;

automatically transmitting the agreement document to the counter-party via the counterparty communication address;

automatically transmitting the agreement document via a communication address associated with the party; and wherein the party is associated with a first party entity and a second party entity, and further comprising:

transmitting the agreement document via a first communication address associated with the first party entity;

receiving information from the first party entity; and transmitting the agreement document via a second communication address associated with the second party entity.

* * * * *